United States Patent [19]
Schilling

[11] Patent Number: 5,469,468
[45] Date of Patent: * Nov. 21, 1995

[54] OVERLAYING SPREAD-SPECTRUM SATELLITE SYSTEM AND METHOD

[75] Inventor: Donald L. Schilling, Sands Point, N.Y.

[73] Assignee: Interdigital Technology Corporation, Wilmington, Del.

[*] Notice: The portion of the term of this patent subsequent to Sep. 27, 2011, has been disclaimed.

[21] Appl. No.: 127,261

[22] Filed: Sep. 27, 1993

Related U.S. Application Data

[63] Continuation-in-part of Ser. No. 622,235, Dec. 5, 1990, Pat. No. 5,351,269.

[51] Int. Cl.⁶ .................................................. H04K 1/00
[52] U.S. Cl. .......................... 375/200; 375/202; 375/205; 380/34
[58] Field of Search .................................. 380/34; 375/1; 455/12.1, 33.1; 379/59

[56] References Cited

U.S. PATENT DOCUMENTS

| | | | |
|---|---|---|---|
| 4,222,115 | 9/1980 | Cooper et al. | 375/1 |
| 4,697,260 | 9/1987 | Grauel et al. | 370/18 |
| 4,799,253 | 1/1989 | Stern et al. | 379/59 |
| 4,901,307 | 2/1990 | Gilhousen et al. | 375/1 X |
| 4,905,221 | 2/1990 | Ichiyoshi | 375/1 X |
| 4,914,651 | 4/1990 | Lusignan | 370/69.1 |
| 5,005,169 | 4/1991 | Bronder et al. | 370/76 |
| 5,040,238 | 8/1991 | Comroe et al. | 455/33 |
| 5,073,900 | 12/1991 | Mallinckrodt | 375/1 |
| 5,185,762 | 2/1993 | Schilling | 375/1 |
| 5,218,618 | 6/1993 | Sagey | 375/1 |
| 5,303,286 | 4/1994 | Wiedeman | 375/1 |
| 5,351,269 | 9/1994 | Schilling | 375/1 |

Primary Examiner—Tod R. Swann
Attorney, Agent, or Firm—David Newman & Associates

[57] ABSTRACT

A spread-spectrum satellite system for communicating data and paging messages to a plurality of remote units. The spread-spectrum communications system has a satellite with an antenna beamwidth located within a same geographical region as covered by an existing FDMA, TDMA or other mobile-satellite system. The spread-spectrum satellite system has a device for converting the format of the data into a form suitable for communicating over radio waves, a spread-spectrum modulator for spread-spectrum processing the data, and a transmitter for transmitting the spread-spectrum-processed-converted data from the satellite to a remote unit. The remote unit has an antenna and a spread-spectrum receiver for recovering data communicated from the satellite. The remote unit optionally may have a comb filter for notch filtering mobile channels of the mobile-satellite system.

25 Claims, 13 Drawing Sheets

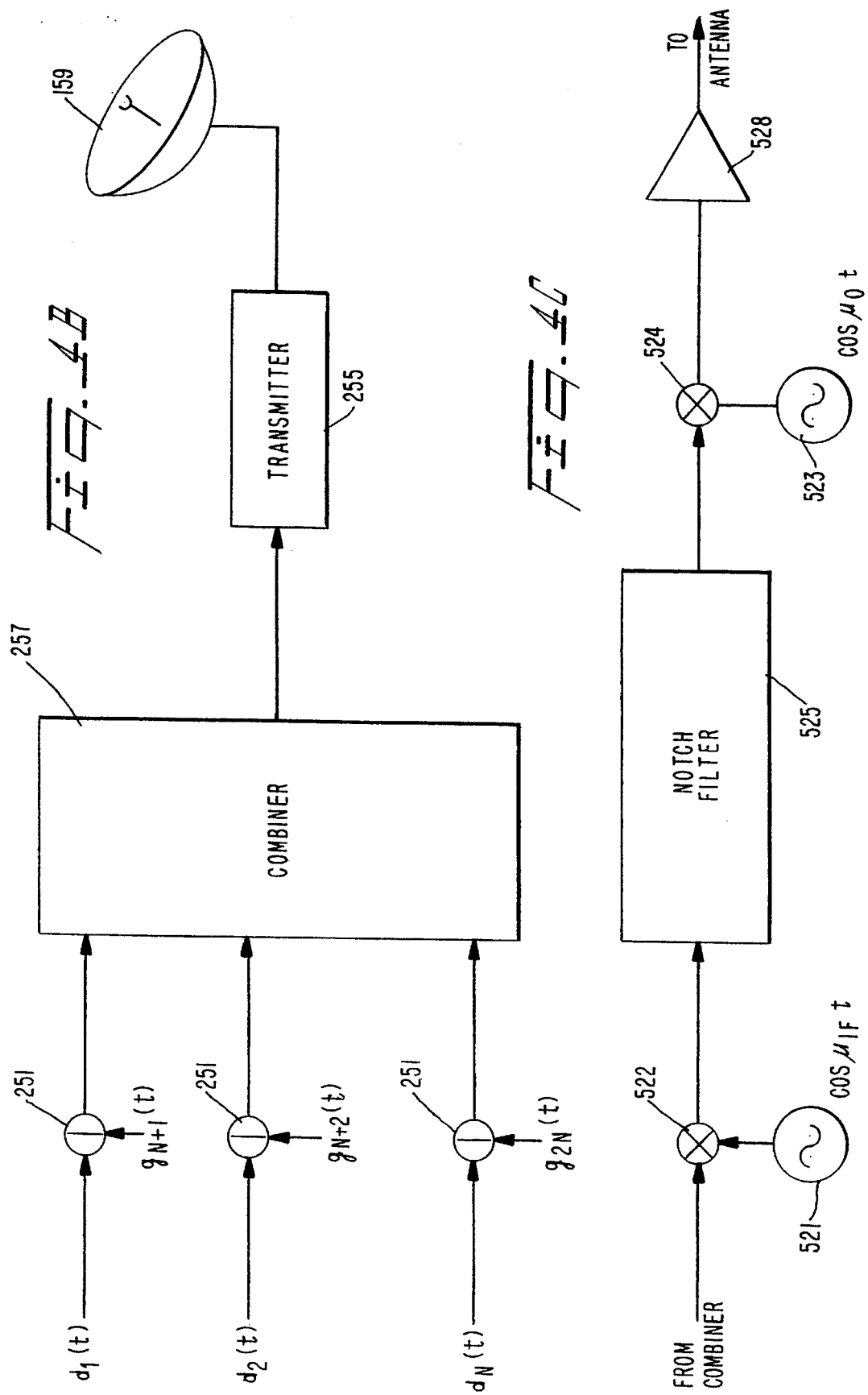

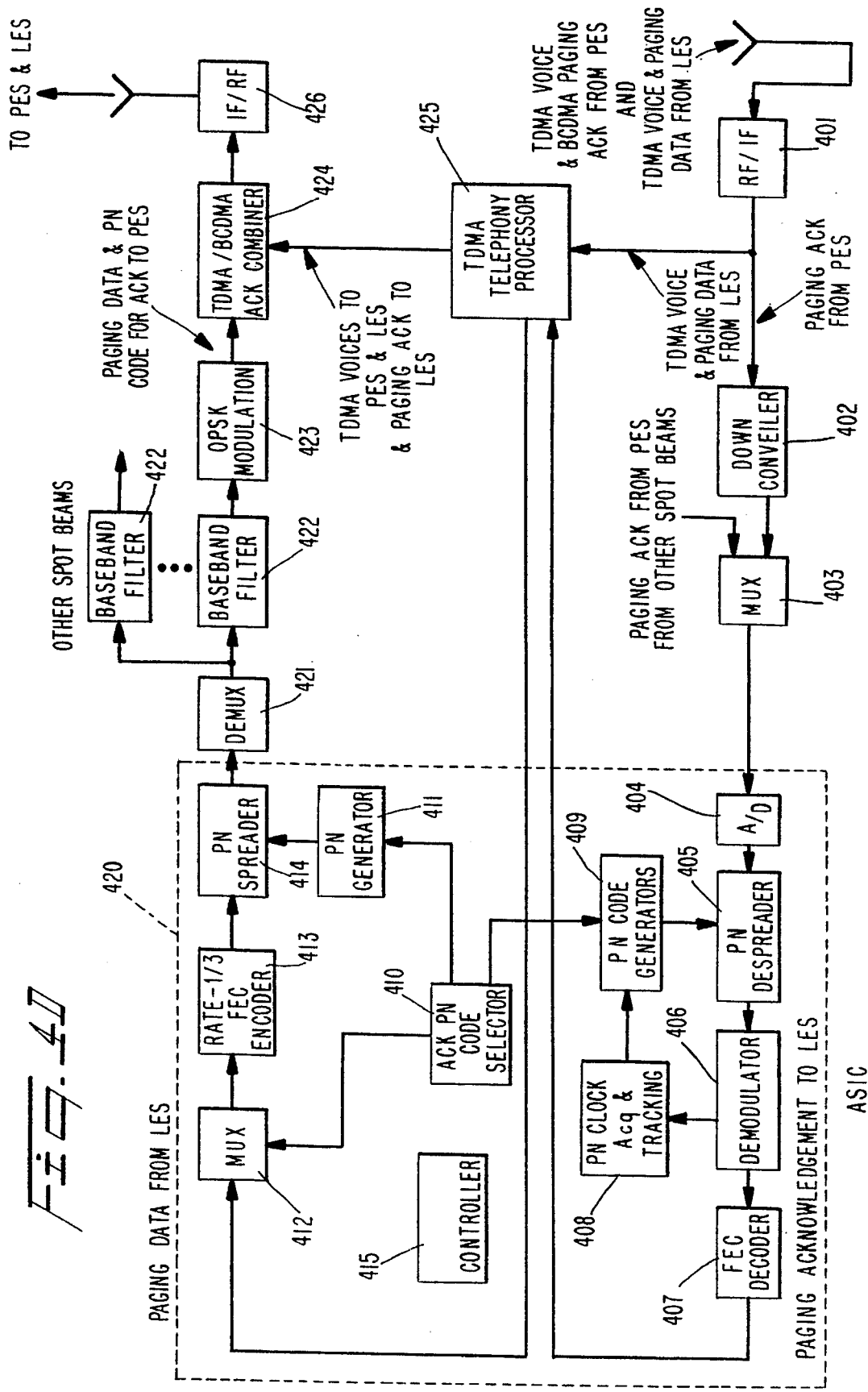

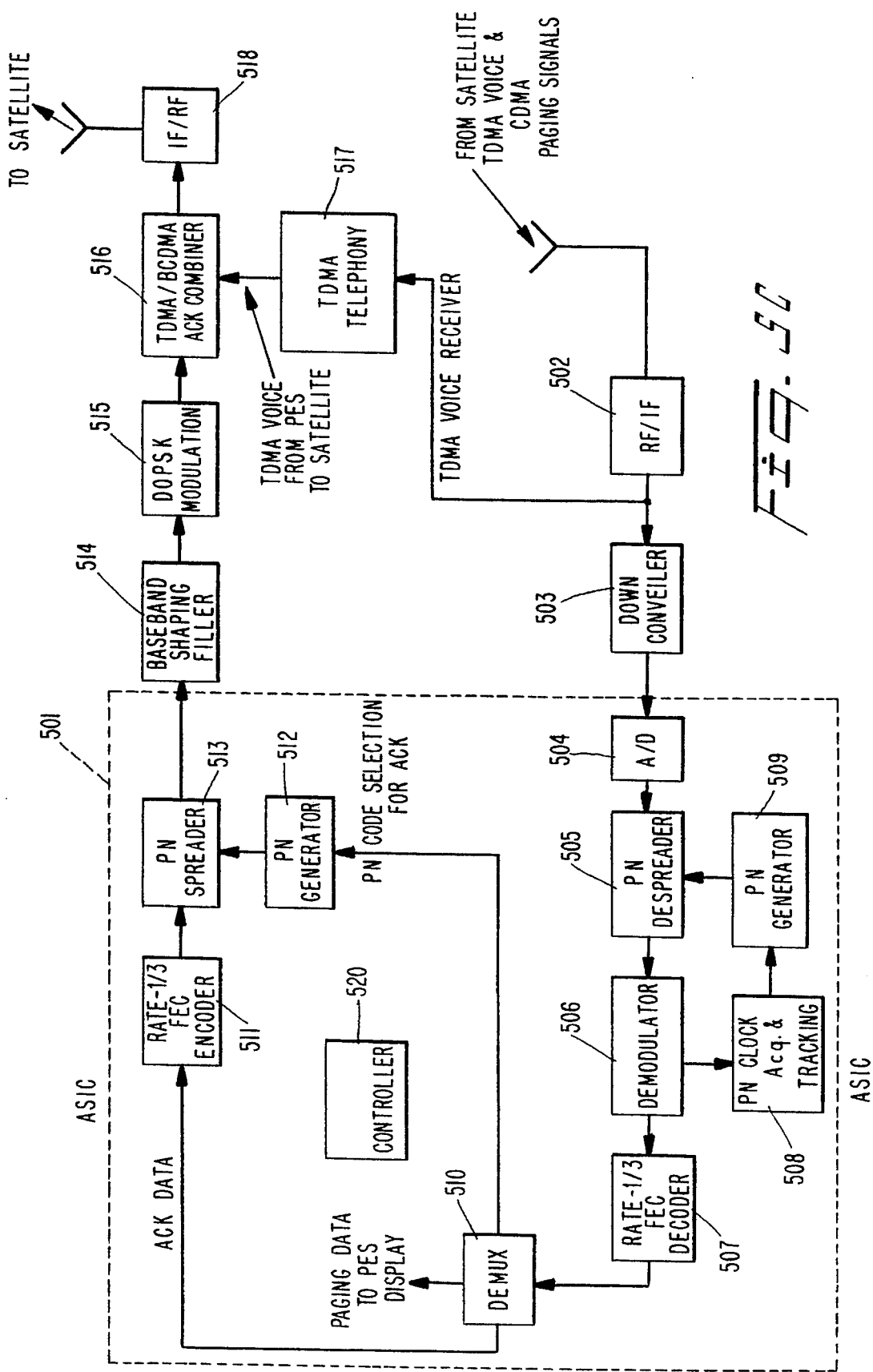

| N | $b_0\ b_1\ \ldots\ b_{N-1}$ |
|---|---|
| 3 | 0 1 1 |
| 4 | 0 0 1 1 |
| 5 | 0 0 1 0 1 |
| 6 | 0 0 0 1 0 1 |
| 7 | 0 0 0 0 0 1 1 |
| 8 | 0 0 0 0 0 0 1 1 |
| 9 | 0 1 1 1 0 0 0 0 1 |
| 10 | 0 0 0 0 1 0 0 1 0 1 |
| 11 | 0 0 0 0 0 0 0 1 0 1 |
| 12 | 0 0 0 0 0 0 0 1 0 1 1 1 |
| 13 | 0 1 0 0 0 0 0 0 0 1 1 0 1 |
| 14 | 1 0 0 0 0 0 0 0 0 0 0 1 1 1 1 |
| 15 | 0 1 0 0 0 0 0 0 0 0 0 0 1 1 1 |

5,469,468

OVERLAYING SPREAD-SPECTRUM SATELLITE SYSTEM AND METHOD

RELATED PATENT

This patent stems from a continuation-in-part patent application of a patent application entitled OVERLAYING SPREAD SPECTRUM CDMA PERSONAL COMMUNICATIONS SYSTEM, having Ser. No. 07/622,235 and filing date of Dec. 5, 1990 now U.S. Pat. No. 5,351,269.

BACKGROUND OF THE INVENTION

This invention relates to spread-spectrum communications and more particularly to a satellite broadcasting or paging system which communicates over the entire bandwidth of an existing frequency division multiple access (FDMA), or time division multiple access (TDMA), satellite system such as the proposed low earth orbiting (LEO) satellite communication system.

DESCRIPTION OF THE RELEVANT ART

The current terrestrial mobile cellular system uses the frequency band 868–894 MHz for transmitting from the mobile user to the cellular system stations and the frequency band 823–849 MHz for transmitting from the cellular system stations to the mobile user. Each of these frequency bands is divided in half to permit two competitive systems to operate simultaneously. Thus, each system has 12.5 MHz available for transmission and 12.5 MHz for reception. Each of the 12.5 MHz bands is divided into 30 kHz channels for voice communications.

A problem in the prior art is limited capacity due to the number of channels available in the mobile radio cellular system.

FIG. 1 is a diagram of the cellular system. A mobile user serviced by cell A located near the border of cells A and B and a mobile user serviced by cell B located near the same border are received by the cellular system stations of cells A and B with almost the same power. To avoid interference between users operating in the same frequency band at comparable power levels, different frequency subbands, i.e. channels are allocated to adjacent cells. FIG. 1 shows a seven frequency scheme, with each cell having a bandwidth, B=12.5 MHz/7, which approximately equals 1.8 MHz. This frequency scheme has adjacent cells operating at different frequencies, thereby reducing interference among users in adjacent cells. This technique is called frequency reuse. As a result of frequency reuse, each cell has N=1.8 MHz/30 kHz=60 channels. Some of these channels are reserved for signalling, leaving approximately 55 channels per cell.

The channels are allocated to cells A through F as shown in FIG. 2. A guard band of 180 kHz separates each channel so that adjacent channel users within the same cell do not interfere with one another.

The cells in a mobile cellular system are expensive to maintain, and profitability can be significantly increased by increasing the number of users per cell. One approach to increase the number of users per cell is to change from analog FM communication, and use digital communication with Time Division Multiple Access (TDMA).

The proposed TDMA mobile cellular system, called IS54, is shown in FIG. 3. In this system, each of the approximately 55 voice channels per cell is time shared by K users. The remaining channels are used for signaling. Currently, K is to be three, but this value is expected to increase to six or more. A cellular system station sequentially probes K users, each of whom use the same 30 kHz frequency band, but at different times. Using this system, the number of cells does not increase, but since there are K users per 30 kHz channel, the total number of users per cell increases by a factor of K.

K is estimated as follows: Analog voice can be converted to a digital signal having a bit rate of 8500 bits per second (bps) without significant degradation in quality, or to a digital signal having a bit rate of 2400 bps with some degradation in quality. For example, using the bit rate of 2400 bps with a rate ½ forward error correction code (FEC), and a digital modulation technique such as quadrature phase shift keying (QPSK), each digital voice signal requires a bandwidth of only 4800 Hz. Thus, K=30 kHz/4.8 k bps=6 users/30 kHz channel. Potentially, the number of users per cell may be 6 users/channel×55 channels/cell =330 users per cell. Similar satellite cellular communication systems are being proposed for LEO, ICO and geosynchronous earth orbiting (GEO). In a satellite system the cells are formed by spot beams and by other satellites in the system.

SUMMARY OF THE INVENTION

An object of the invention is a satellite broadcasting or paging system, i.e., point to point or to multipoint, which allows for increasing capacity for communications in a mobile satellite radio cellular system environment, using the same frequencies as used for the mobile satellite radio system.

Another object of the invention is a satellite broadcasting or paging system which can be used concurrently with a mobile satellite system without interfering with the mobile satellite system. The satellite broadcasting or paging system can cover geographically and overlay in spectrum, an already existing coverage area of a mobile satellite system, without significant modifications to the mobile satellite communication system.

According to the present invention, as embodied and broadly described herein, a spread-spectrum satellite broadcasting or paging system is provided for communicating data from a satellite to a plurality of broadcasting or pager users. The broadcasting or pager users receive data from the satellite. Data may be, but are not limited to, computer data, facsimile, broadcast messages or paging messages.

The spread spectrum satellite system could be a different satellite system from the TDMA or FDMA mobile satellite system or could use the same platform as the mobile satellite system. The spread spectrum satellite system could be geostationary or mobile. In either case the spread spectrum system shares the bandwidth, by overlaying on it, of the TDMA or FDMA system.

The spread-spectrum satellite system radiates a signal within the same geographical region as covered by a mobile communication satellite system. The mobile satellite system has a mobile bandwidth. Typically, the mobile bandwidth is 16 MHz. However, a bandwidth as small as 10 MHz or as large as 60 MHz is possible. The mobile bandwidth is divided into a plurality of mobile channels. The mobile channels may be separated by guard bands. The mobile satellite system has mobile users communicating on the mobile channels using TDMA or FDMA.

The spread-spectrum satellite system has a system antenna with an antenna beamwidth which overlays, at least in part, the same geographical region as covered by an antenna used with the mobile satellite system. The spread spectrum satellite system can be stationary or mobile. The spread-spectrum satellite communicates data to the plurality of broadcasting or pager users. A broadcasting or pager user uses a broadcasting or pager unit. Each satellite may employ a number of spot beams to eliminate different regions of the world. These spot beams may overlap. In addition, the spot beams other from satellites in the system may partially overlay the same geographical regions. The overlap may cause interference as in any cellular system.

The spread-spectrum satellite system has system-converting means, system-product-processing means, system-transmitting means, and a system antenna. The spread-spectrum satellite system optionally may have system-filtering means. The system-converting means converts the format of the data to be transmitted to a user into a form suitable for communicating over radio waves. The system-product-processing means processes the data with spread-spectrum modulation. The system-transmitting means transmits across the mobile bandwidth, from the satellite through the system antenna to a broadcasting or pager receiving unit, the spread-spectrum-processed-converted data. The system-filtering means may be used for placing notches in the spectrum of the spread-spectrum-processed-converted data. The notches may be located at the mobile channels of the mobile satellite system.

The plurality of broadcasting or pager units, denoted hereinafter as remote units, are located in the geographical region covered by the spread-spectrum satellite system. Each of the remote units has a remote antenna, remote-detection means, and, optionally, remote filter means. The remote-detection means recovers data communicated from the satellite. The remote filter means notch filters which can be used to notch the predetermined channels of the mobile system where necessary.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 4B is a block diagram of a second embodiment of a spread-spectrum satellite system transmitter;

FIG. 4C illustrates a notch filter for a spread-spectrum satellite system;

FIG. 4D illustrates a detailed block diagram of a spread-spectrum satellite transmitter and receiver when there is processing on board the satellite;

FIGS. 5A and 5B are block diagrams of a remote-unit receiver;

FIG. 7 shows a spread-spectrum data signal with the spread-spectrum signal power equal to an AM signal power;

FIG. 8 shows an audio signal when the spread-spectrum signal power is equal to the AM signal power;

DETAILED DESCRIPTION OF THE PREFERRED EMBODIMENTS

Figure 1:
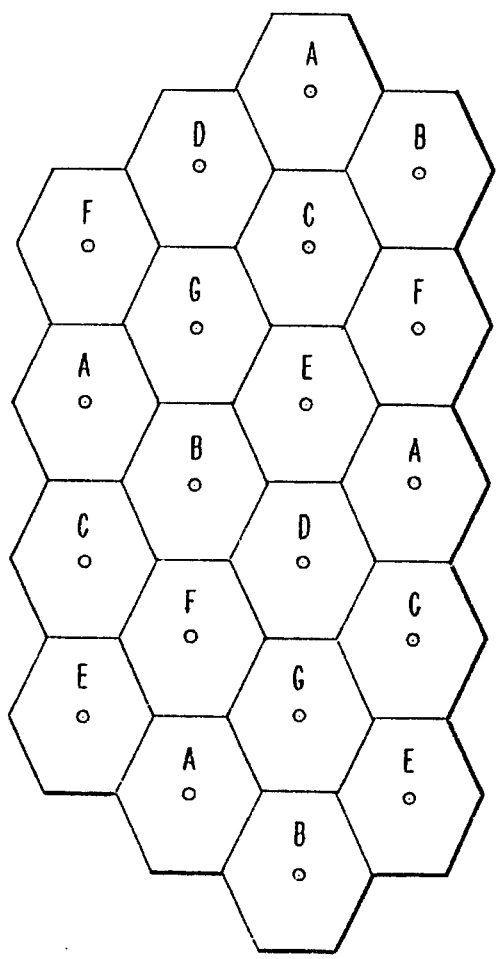
FIG. 1 illustrates a seven frequency-set mobile cellular plan.
Figure 2:
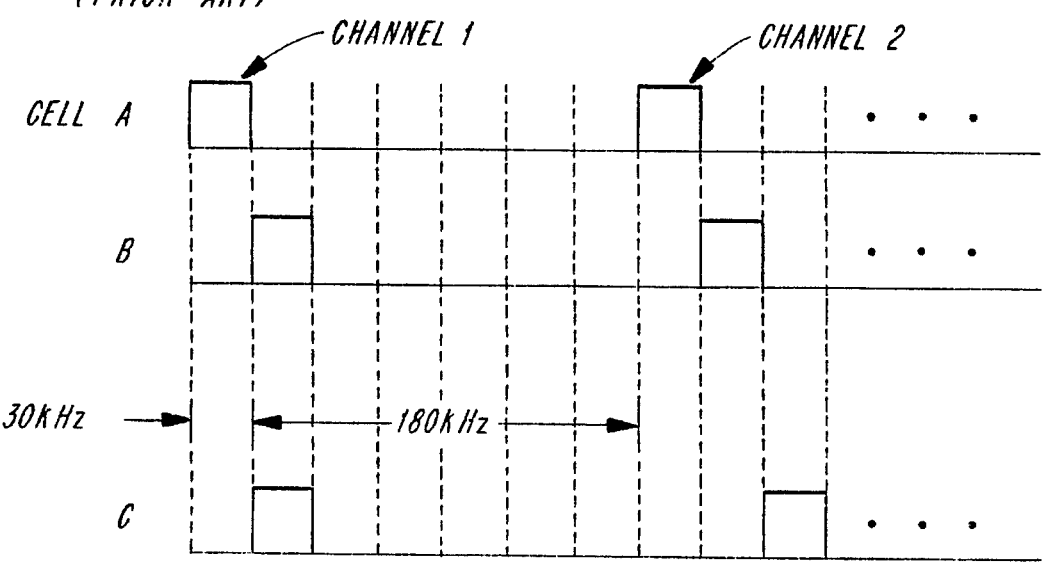
FIG. 2 shows cellular channels which are separated by a guard band of 180 kHz.

Reference is now made in detail to the present preferred embodiments of the invention, examples of which are illustrated in the accompanying drawings, wherein like reference numerals indicate like elements throughout the several views.

The spread spectrum CDMA broadcasting or paging system may be a part of the TDMA or FDMA communication system of a GSO, ICO or LEO satellite system, wherein called the "mobile" satellite system, or it may be contained in a different satellite system.

The spread-spectrum satellite system radiates a spread-spectrum signal within a same geographical region as covered by a mobile satellite system. The mobile satellite system has a mobile bandwidth which can be used for frequency division multiplex (FDM) or for time division multiplex (TDM). The term "mobile bandwidth" is used herein to denote the system bandwidth for a plurality of channels of a mobile satellite system. In presently deployed terrestrial based, mobile cellular systems, the mobile bandwidth is 12.5 MHz. Anticipated mobile satellite system bandwidths are 10 MHz or more.

The mobile bandwidth is divided into a plurality of mobile channels. The term "mobile channel" is used herein to denote the communications channel of a mobile satellite system. Each mobile channel may have a bandwidth of 30 kHz. The mobile channels typically are separated by guard bands. A possible guard band separation is 180 kHz. Cellular users communicate on the mobile channels, in presently deployed terrestrial cellular systems, using frequency modulation (FM).

Each satellite may employ up to several hundred spot beams in order to cover a larger geographical area. The spot beams from the same and from different satellites may overlap in part, causing interference, if a high reuse factor is not employed.

Alternatively, the mobile satellite system may employ TDMA or FDMA technology, as previously discussed, or a narrow band CDMA (NCDMA) technology.

The spread-spectrum satellite system includes one or more satellites and a plurality of remote units located within the same geographical region as covered by the mobile satellite system. The spread-spectrum satellite system is used for communicating data to the plurality of remote users. The data may be, but are not limited to, computer data, broadcasting, facsimile, stocks, or paging messages.

A satellite of the spread-spectrum satellite system has an antenna beamwidth overlaying geographically, at least in part, an antenna beamwidth of the mobile satellite system, for communicating data to the plurality of remote users. Within the geographical region, a first user uses a first remote unit, and a second user uses a second remote unit, a third user uses a third remote unit, etc.

The spread-spectrum satellite system includes a satellite and ground station. The spread-spectrum satellite system may use the same, or different, satellite platform as used for the mobile satellite system. Likewise, the spread-spectrum satellite system may use the same or different ground station as used for the mobile satellite system. Located either in the ground station or on board the satellite are system-converting means and system- product-processing means. System-filtering means is optional. The system-filtering means may be located either in the ground station or on board the satellite. Located on board the satellite are system-transmitting means and a system antenna. The term "system" as a prefix designates that an element is part of the ground station or satellite.

Figure 4A:
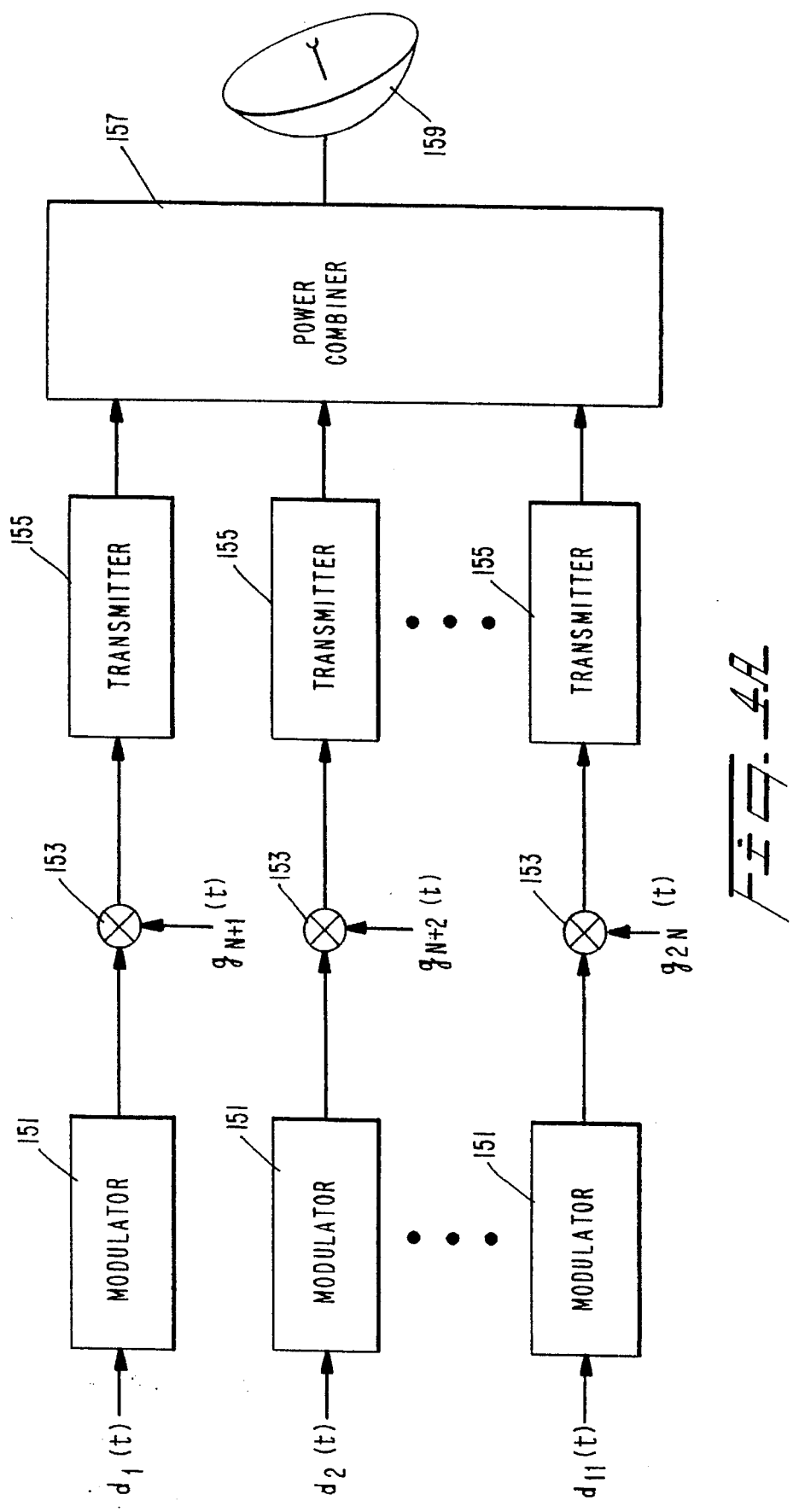
FIG. 4A is a block diagram of a first embodiment of a spread-spectrum satellite system transmitter.

FIG. 4A illustrates the spread-spectrum satellite system. The system-converting means, as illustrated in FIG. 4A, may be embodied as a system modulator 151. The system modulator 151 converts the format of data to be transmitted to a user into a form suitable for communicating over radio waves. For example, a numerical or alpha-numerical signal may be converted to a system-data signal, which may be binary or quadrature phase-shift keyed modulated. The system-data signal may be source encoded.

The system-product-processing means may be embodied as a system-spread-spectrum modulator 153. The system-spread-spectrum modulator 153 is coupled to the system modulator 151. The system-spread-spectrum modulator 153 modulates the converted-data signal using spread-spectrum modulation. The converted data, which may be embodied as binary phase shift keyed (BPSK) data from the BPSK modulator, or other source, may be multiplied using a product device 153 by a selected spread-spectrum spreading sequence, $g_{N+i}(t)$. The selected spread-spectrum spreading sequence, $g_{N+i}(t)$ may be generated by a pseudorandom generator, as is well known in the art.

Alternatively, the system-product-processing means may be embodied as a matched filter or surface-acoustic-wave (SAW) device. The SAW device can modulate the converted data with spread-spectrum modulation. The spreading sequence of a SAW device is the impulse response of the device, as is well known in the art.

The system-transmitting means may be embodied as a system transmitter 155. The system transmitter 155 is coupled to the system-spread-spectrum modulator 153. The system transmitter 155 transmits across the mobile bandwidth, the spread-spectrum- processed-converted data from the satellite to a remote unit. The system transmitter 155 includes modulating the spread-spectrum processed converted data at a carrier frequency, $f_o$, and an appropriate power amplifier.

The system-transmitter 155 has a transmitter oscillator which supplies a carrier signal at the carrier frequency. The transmitter oscillator is coupled to a transmitter product device. The transmitter multiplies, using the transmitter-product device, the spread-spectrum-processed-converted data by the carrier signal.

The transmitting means may, in a preferred embodiment, transmit data using a spread-spectrum signal having a power level limited to a predetermined level. The transmitting means may transmit data in a time division format. Thus, a single spread-spectrum signal may include a plurality of subchannels having data time division multiplexed.

A plurality of modulators 151, product devices 153 and transmitters 155 may be coupled through a power combiner 157 to an antenna 159 for simultaneously transmitting a multiplicity of spread-spectrum channels. FIG. 4A is an illustrative embodiment for generating simultaneous spread-spectrum signals, and there are many variants for interconnecting product devices, modulators and transmitters, for accomplishing the same function.

As an alternative example, FIG. 4B illustrates a spread-spectrum satellite system transmitter which may be used for producing the same result as the transmitter of FIG. 4A. In FIG. 4B data are modulo-2 added, using EXCLUSIVE-OR gates 253 with a selected spread-spectrum spreading sequence, $g_{N+i}(t)$. The resulting spread-spectrum-processed data from a plurality of EXCLUSIVE-OR gates 253 are combined using combiner 257. The system transmitter 255 modulates the combined spread-spectrum-processed data at the carrier frequency, $f_o$. The system transmitter 255 is coupled to the system antenna 159 and simultaneously transmits the plurality of spread-spectrum-processed data as a multiplicity of spread-spectrum channels, on a spread-spectrum signal.

FIG. 4C illustratively shows the system-filter means embodied as a notch filter 525, as part of a spread-spectrum satellite system transmitter. The embodiment shown in FIG. 4C may be employed in the system transmitters 155, 255, of FIGS. 4A and 4B. The notch filter 525 inserts one or more notches in the power spectrum transmitted from the system-transmitting means. The notches are located at the same frequency as a mobile channel of a mobile satellite system, and typically have the same bandwidth as the mobile channel. Preferably, the notches provide 15 dB or more attenuation.

The notch filter 525 can be implemented at baseband, at an intermediate frequency of the transmitter, or with technology permitting, the notch filter could operate at the carrier frequency, $f_o$. The notch filter 525 is shown as an example, in FIG. 4C, coupled between a first transmitter mixer 522 and a second transmitter mixer 524. The first transmitter mixer 522 is coupled to a first local oscillator 521, and the second transmitter mixer 524 is coupled to a second local oscillator 523. A transmitter typically has a power amplifier 528 coupled to an output of the second local oscillator 523.

Typically, a spread-spectrum satellite system and a mobile satellite system have fixed geographic coverage areas, and each mobile channel is at a preassigned frequency and bandwidth. Thus, a notch filter for a spread-spectrum satellite system can be a fixed design. The notch filter for a spread-spectrum satellite system alternatively may be an adjustable notch filter. The adjustable notch filter can be responsive to a dynamic environment, where mobile signals or mobile channels appear unexpectedly, or vary with frequency.

The notch in the spectrum of the transmitted spread-spectrum signals from the spread-spectrum satellite system is less than the bandwidth of the spectrum of the spread-spectrum signal. For example, the transmitted spread-spectrum signals from a spread-spectrum satellite system might have a bandwidth of 16 MHz. Each mobile channel might have a mobile bandwidth of less than 30 kHz. Thus, in this example, each notch in a notch filter would reduce the energy in the transmitted spread-spectrum signal from the spread-spectrum satellite system by approximately only 0.2% or less.

FIG. 4D shows, by way of example, a detailed block diagram of the satellite transmitter and receiver. The satellite receives through RF/IF circuit 401 TDMA modulated voice and/or B-CDMA modulated paging acknowledgement (ACK) signals from the PES as well as TDMA modulated voice and paging data from the LES. Each LES transmits this paging data along with the information regarding which spot beam, and which satellite, illuminates the user. The resulting IF signal is down converted by down converter 402. All of the ACKs from all of the spot beams are multiplexed with the down-converted IF signal by multiplexer 403, digitized by analog to digital converter 404, despread by PN despreader 405, demodulated by demodulator 406 and decoded by FEC decoder 407. The paging ACKs are then inputted to the TDMA telephony processor 425 where they are TDMA modulated for transmission to the LES. The TDMA paging data from the LES is decoded and then sent from the TDMA telephony processor 425 to the B-CDMA transmitter. At the transmitter each of the paging signals is FEC block encoded by FEC encoder 413 using the rate −⅓ projection code and spread by PN spreader 414 by the spreading PN sequence generated by PN generator 411. Each page uses the same PN sequence so that each PES receiver has the same code. The output of the PN spreader 414 is then sorted in the demultiplexer 421, depending on the spot beam to be used. Each data modulated PN sequence, operating at a chip rate of approximately 8 MHz, when filtered by the baseband shaping filter 422, is constrained to occupy a noise bandwidth of 10 MHz. Each baseband filter 422 output is modulated with QPSK by QPSK modulator 423, combined with ACK signals by TDMA/BDCMA ACK combiner 424, and up converted, amplified and transmitted through its individual spot beam.

For a spread-spectrum system to operate properly, the spread-spectrum receiver must acquire the correct phase position of the received spread spectral signal, and the receiver must continually track that phase position so that loss-of-lock does not occur. The two processes of acquisition and tracking form the synchronization subsystem of a spread-spectrum receiver. The former operation typically is accomplished by a search of as many phase positions as necessary until one is found which results in a large correlation between the phase of the incoming signal and the phase of the locally generated spreading sequence at the receiver. The latter operation often is performed with a delay-locked loop. The importance of the combined synchronization process cannot be overstated for if synchronization were not both achieved and maintained, the desired signal cannot be despread.

The present invention also includes remote units which are located within a same geographic region as covered by the satellite antenna. The following discussion uses the term "remote" as a prefix to indicate that the elements are included with or in a remote unit. Each of the remote units has a remote antenna and remote-detection means. The remote-detection means is coupled to the remote antenna. The remote-detection means includes remote-spread-spectrum-processing means.

The remote-detection means recovers data communicated to the remote unit from the satellite. The remote-detection means also includes means for converting the format of the data into a form suitable for a user. The format may be, for example, computer data, message data or other information. The remote-detection means, by way of example, may include tracking and acquisition circuits for the spread-spectrum signal, a product device for despreading the spread-spectrum signal and an envelope detector. FIG. 5A illustratively shows remote-detection means embodied as a remote-spread-spectrum demodulator 161, remote-bandpass filter 163, and remote-data detector 165, coupled to a remote antenna 169.

The remote-spread-spectrum demodulator 161 despreads, using a spreading sequence signal having the same or selected-spreading sequence, $g_{N+i}(t)$, as the selected channel of the received spread-spectrum signal, the spread-spectrum signal received from the satellite. The bandpass filter 163 filters the despread signal and the remote-data detector 165 puts the format of the despread spread-spectrum signal into a form suitable for a user.

Equivalently, the remote-detection means may be embodied as a spread-spectrum receiver having a matched filter or SAW device. With a matched filter or SAW device, the impulse response of the matched filter or SAW device is matched to the selected-spreading sequence, $g_{N+i}(t)$, as the received spread-spectrum signal.

The remote-spread-spectrum-processing means includes means for storing or generating a local spreading sequence, gN+i(t), for comparing to signals received for recovering data sent from the spread-spectrum satellite to the remote unit.

The remote-spread-spectrum-processing means also may include means for synchronizing the remote-spread-spectrum-processing means to received signals. Similarly, the remote-spread-spectrum-processing means at the remote unit includes means for processing data for particular remote units with a selected spreading sequence.

The remote-filtering means, as shown in FIG. 5A, may be embodied as a comb filter 140. The comb filter 140 notches the mobile channels of the mobile satellite system for the case of a FDM mobile satellite system. The comb filter 140 is optional for reducing the combined interfering power level from mobile satellite users with the satellite. For the presently deployed terrestrial mobile cellular systems, by way of example, the comb filter 140 would serve as a plurality of notch filters, blocking the 30 kHz bandwidth at each frequency location of the mobile channels of the mobile cellular system.

FIG. 5B illustrates an alternative embodiment of a spread-spectrum receiver. In FIG. 5B, a low noise amplifier (LNA) 181 is coupled between the remote antenna 169 and a down converter 182. An automatic gain control (AGC) circuit 183 is coupled between the down converter 182 and a despreader 184. A data detector 185 is coupled between the despreader 184 and forward error correction (FEC) decoder 186. The despreader 184, detector 185 and FEC decoder 186, by way of example may be built as an application specific integrated circuit (ASIC) 187.

The down converter 182 converts a carrier frequency of a received spread-spectrum signal to an appropriate intermediate frequency (IF). The AGC circuit 183 operated on the received spread-spectrum signal at IF. The despreader 184 may be embodied as a product device, matched filter or equivalent devices already discussed or known in the art. The data detector 185 detects data in a despread, received spread-spectrum signal. The FEC decoder 186 corrects errors in the data, as is well known in the art.

Figure 5C:
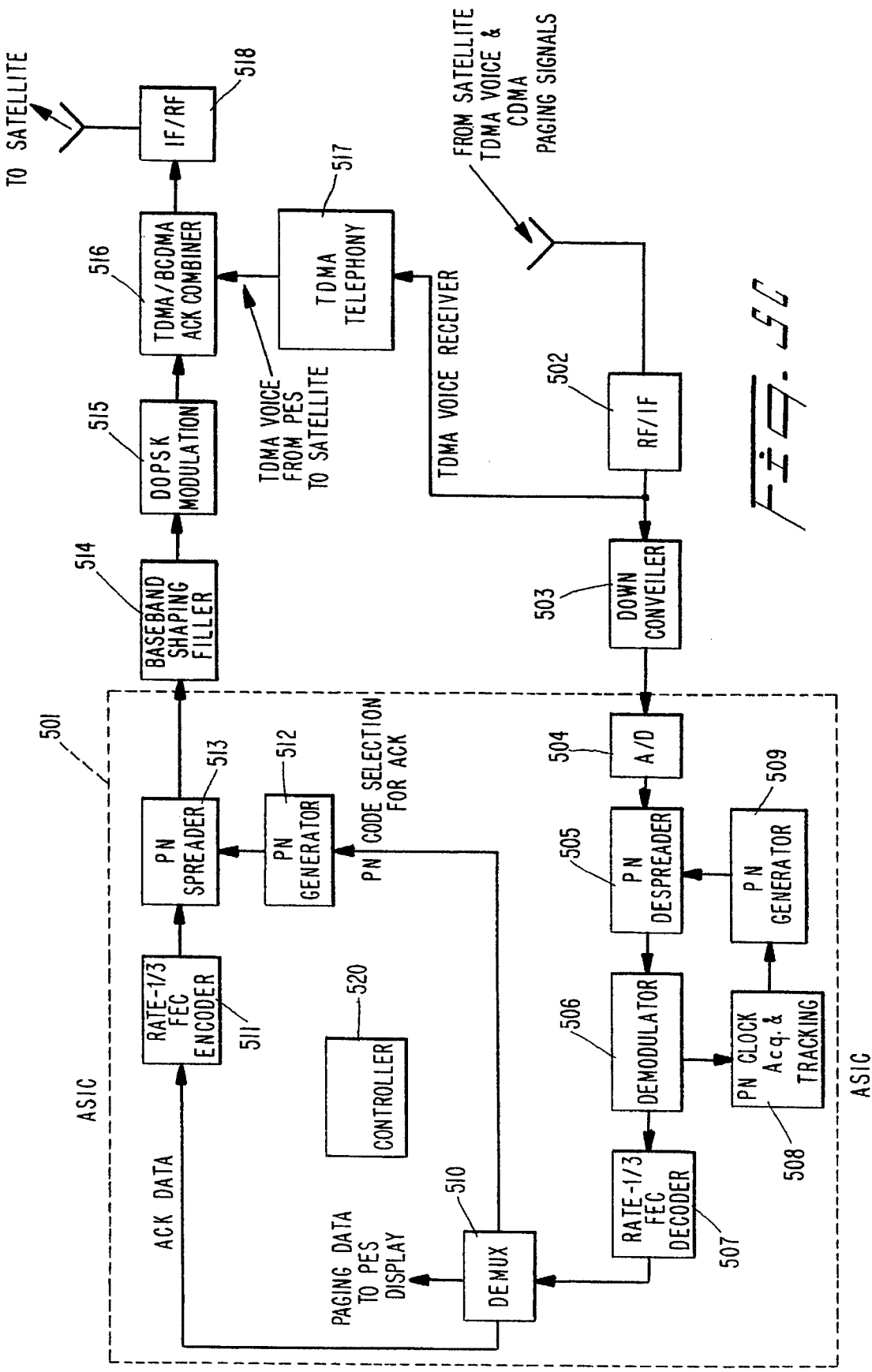
FIG. 5C illustrates a detailed block diagram of a spread spectrum remote unit and receiver.

FIG. 5C presents, by way of example, a detailed block diagram of a remote unit transmitter and receiver. The paging signal is received and brought to an IF frequency through the RF/IF circuit 502. The IF signal is down converted by down converter 503 to baseband and processed in an ASIC 501. The ASIC includes an A/D converter 504, PN despreader 505, demodulator 506, FEC decoder 507, PN generator 509, and PN clock acquisition and tracking 508. The PN despreader 505 first despreads the signal and then digitally filters the signal using a 16 point fast Fourier transform (FFT) to remove doppler. The FEC decoder 507 is a rate ⅓ projection code which provides both burst and random error protection. Preferred projection codes are described in U.S. Pat. Nos.: 4,796,260; 4,849,976; 4,847, 842; and, 4,849,974; which are incorporated herein by reference. The decoded output is demultiplexed by demultiplexer 510 to provide three signals: the paging signal which is inputted to the PES display; the PN code parameters for the transmitter ACK; and, the proper ACK data to be sent to the LES via the satellite.

The ACK data, which includes the message number, PES ID and pager's ID, are FEC encoded by FEC encoder 511 using a rate ⅓ Projection Code, and spread by PN spreader 513 using a PN spreading sequence from PN generator 512. The spread signal is baseband filtered by baseband shaping filter 514, DQPSK modulated DQPSK modulator 515 and combined by TDMA/BCDMA ACK combiner 516 with the TDMA voice signal. The combined TDMA voice/B-CDMA ACK signal is up converted and amplified in the IF/RF section and 518 transmitted to the satellite.

A key to the present invention is that the spread-spectrum signals are designed to be transparent to other users, i.e., spread-spectrum signals are designed to provide negligible interference to the communication of other, existing users of the mobile satellite system. The presence of a spread-spectrum signal is difficult to determine. This characteristic is known as low probability of interception (LPI) and low probability of detection (LPD). The LPI and LPD features of spread-spectrum allow transmission between users of a spread-spectrum satellite broadcasting or paging system without the existing users of the mobile satellite system experiencing significant interference. The present invention makes use of LPI and LPD with respect to the mobile channels using FM in a mobile cellular system. By having the power level of each spread-spectrum signal below the predetermined level, then the total power from all spread-spectrum used within a cell does not interfere with users in the mobile cellular system.

Spread-spectrum modulation is also "jam" or interference resistant. A spread-spectrum receiver spreads the spectrum of the interfering signal. This reduces the interference from the interfering signal so that it does not noticeably degrade performance of the spread-spectrum system. This feature of interference reduction makes spread-spectrum modulation useful for commercial communications, i.e., the spread-spectrum waveforms can be overlaid on top of existing narrowband signals.

The present invention preferably employs direct sequence spread-spectrum modulation, which uses a phase modulation technique. Direct sequence spread-spectrum takes the power that is to be transmitted and spreads it over a very wide bandwidth so that the power per unit bandwidth (watts/hertz) is minimized. When this is accomplished, the transmitted spread-spectrum power received by a mobile user, having a relatively narrow bandwidth, is only a small fraction of the actual transmitted power.

In a spread-spectrum satellite system, by way of example, if a received signal having a power of 10 milliwatts is spread over a mobile bandwidth of 12.5 MHz, and a satellite TDMA user employs a communication system having a channel bandwidth of only 30 kHz, then the effective interfering power due to one spread-spectrum signal, in the narrow band communication system, is reduced by the factor of more than one thousand, which is 10 milliwatts divided by 1000 or 0.01 mW. For fifty concurrent users of spread-spectrum, the power of the interfering signal due to spread-spectrum modulation is increased by fifty.

The feature of spread-spectrum modulation that results in interference reduction is that the spread-spectrum receiver actually spreads the received energy of any interferer over the same wide bandwidth, 12.5 MHz in the present example, while compressing the bandwidth of the desired received signal to its original bandwidth. For example, if the original bandwidth of the desired signal is only 30 kHz, then the power of the interfering signal is reduced by thirty thousand divided by 12.5 million, or a reduction by a factor of approximately two thousand.

Direct sequence spread-spectrum achieves a spreading of the spectrum by modulating the original signal with a very wideband signal relative to the data bandwidth. This wideband signal is chosen to have two possible amplitudes, +1 and −1, and these amplitudes are switched, in a pseudo-random manner, periodically. Thus, at each equally spaced time interval, a decision is made as to whether the wideband modulating signal should be +1 or −1. If a coin were tossed to make such a decision, the resulting sequence would be truly random. However, in such a case, the receiver would not know the sequence a-priori and could not properly receive the transmission. Instead, chip-code generator generates electronically an approximately random sequence, called a pseudo-random sequence, which is also know as a pseudo-noise (PN) sequence, which is known a-priori to the transmitter and receiver.

To illustrate the characteristics of spread-spectrum, modulation consider 4800 bps data which are binary phase-shift keyed (BPSK) modulated. The resulting signal bandwidth is approximately 9.6 kHz. This bandwidth is then spread using direct sequence spread-spectrum to 3 MHz. Thus, the processing gain, N, is approximately 300 or 25 dB.

Figure 6:
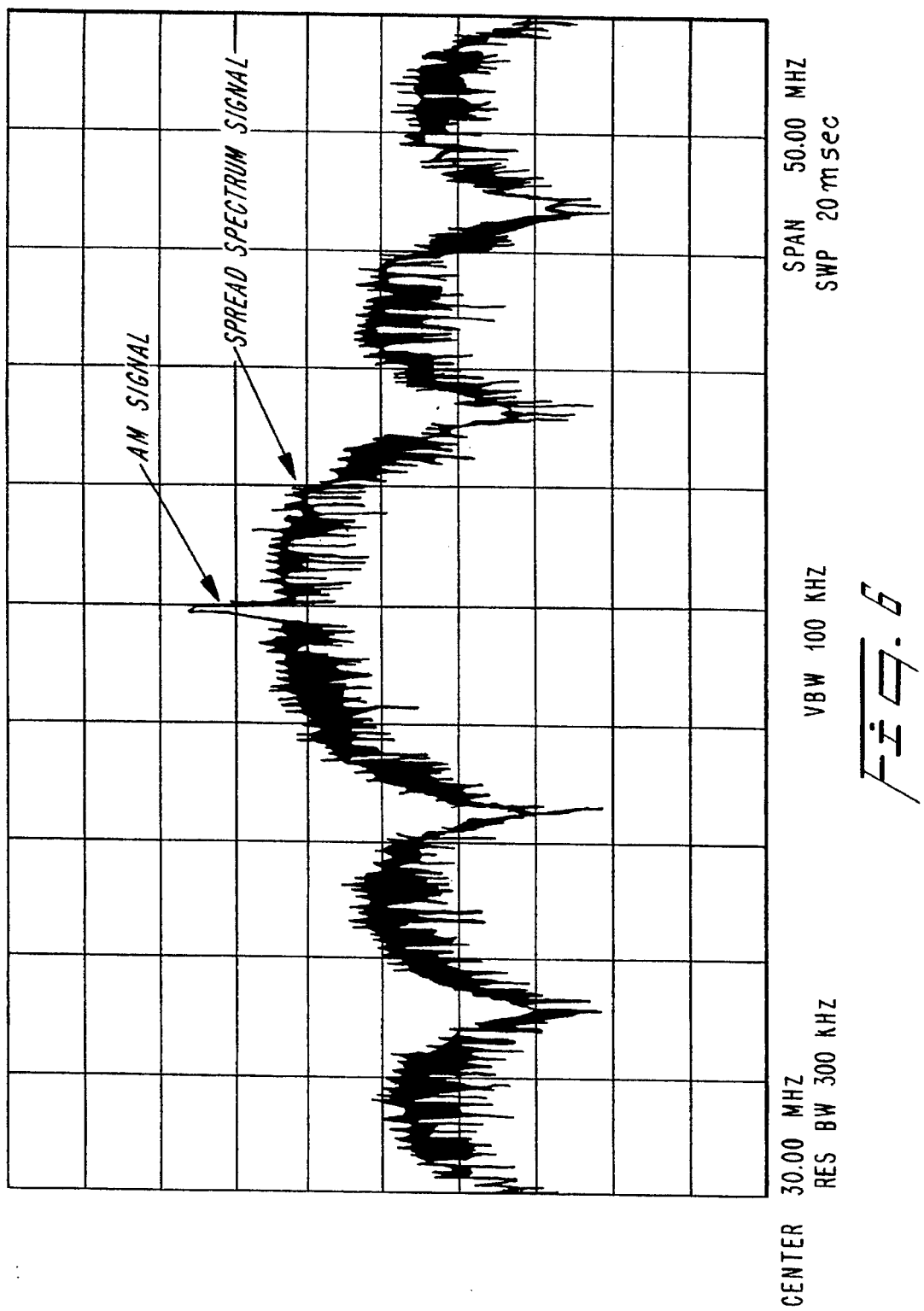
FIG. 6 shows a spread-spectrum signal.

FIG. 6 shows the spectrum of this spread-spectrum signal on an amplitude modulated 3 kHz sinusoidal signal, when they each have the same power level. Assume the bandwidth of the AM waveform is 6 kHz. Both waveforms have the carrier frequency.

FIG. 7 shows the demodulated square-wave data stream. This waveform has been processed by an "integrator" in the receiver, hence the triangular shaped waveform. Note that positive and negative peak voltages representing a 1-bit and 0-bit are clearly shown. FIG. 8 shows that the demodulated AM signal replicates the 3 kHz sine wave.

The AM signal does not degrade the reception of data because the spread-spectrum receiver spreads the energy of the AM signal over 3 MHz, while compressing the spread-spectrum signal back to its original 9.6 kHz bandwidth. The amount of the spread AM energy in the 9.6 kHz BPSK bandwidth is the original energy divided by N=300, or, equivalently, it is reduced by 25 dB. Since both waveforms initially were of equal power, the signal-to-noise ratio is now 25 dB, which is sufficient to obtain a very low error rate.

The spread-spectrum signal does not interfere with the AM waveform because the spread-spectrum power in the bandwidth of the AM signal is the original power in the spread-spectrum signal divided by $N_1$, where $$N_1 = \frac{3 \text{ MHz}}{6 \text{ kHz}} = 500 \text{ (or 27 dB)}$$

hence the signal-to-interference ratio of the demodulated sine wave is 27 dB.

Figures 1, 4, 10:
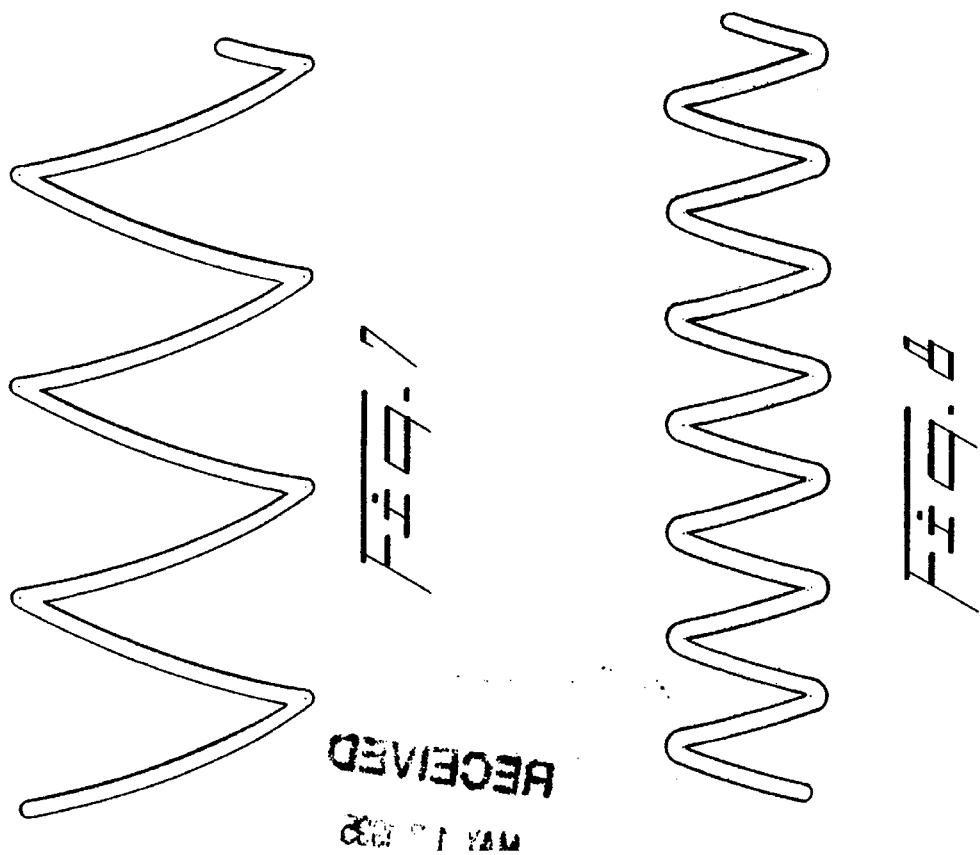
FIG. 10 shows position settings of switches of FIG. 11 to form PN sequences.
Figure 9:
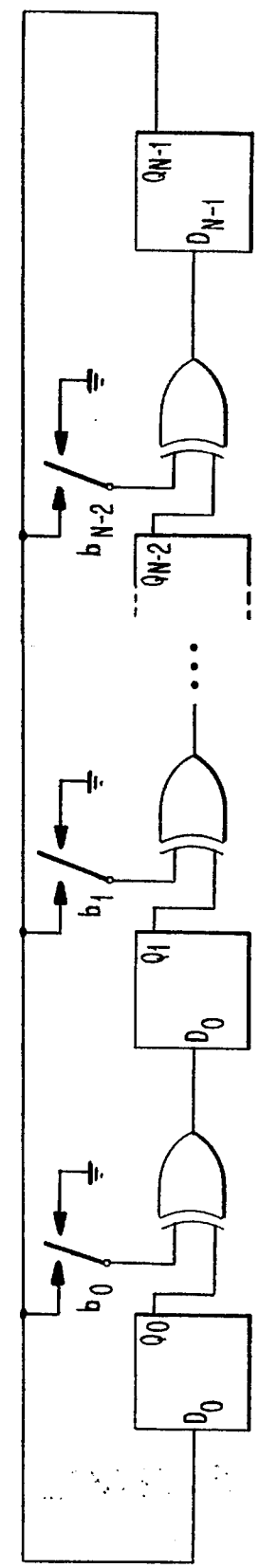
FIG. 9 shows a pseudo-random sequence generator.

The direct sequence modes of spread-spectrum uses pseudo random sequences to generate the spreading sequence. While there are many different possible sequences, the most commonly used are "maximal-length" linear shift register sequences, often referred to as pseudo noise (PN) sequences. FIG. 9 shows a typical shift register sequence generator. FIG. 10 indicates the position of each switch $b_i$ to form a PN sequence of length L, where $$L = 2^N - 1$$

The characteristics of these sequences are indeed "noise like". To see this, if the spreading sequence is properly designed, it will have many of the randomness properties of a fair coin toss experiment where "1"= heads and "−1"= tails. These properties include the following:

1) In a long sequence, about ½ the chips will be +1 and ½ will be −1.
2) The length of a run of r chips of the same sign will occur about $L/2^r$ times in a sequence of L chips.
3) The autocorrelation of the sequence $PN_i(t)$ and $PN_i(t+\tau)$ is very small except in the vicinity of r=0.
4) The cross-correlation of any two sequences $PN_i(t)$ and $PN_j(t+\tau)$ is small.

Code Division Multiple Access

Code division multiplex (CDM) and code division multiple access (CDMA) are direct sequence spread-spectrum systems in which a number, at least two, of spread-spectrum signals communicate simultaneously, each operating over the same frequency band. In a CDM or CDMA system, each user is given a distinct spreading sequence. This spreading sequence identifies the user. For example, if a first user has a first spreading sequence, $g_1(t)$, and a second user a second spreading sequence, $g_2(t)$, etc., then a receiver, desiring to listen to the first user receives at its antenna all of the energy sent by all of the users. However, after despreading the first user's signal, the receiver outputs all the energy of the first user but only a small fraction of the energies sent by the second, third, etc., users.

CDM and CDMA systems are interference limited. That is, the number of users that can use the same spectrum and still have acceptable performance is determined by the total interference power that all of the users, taken as a whole, generate in the receiver.

The present invention is for a CDMA/FDMA, CDMA/TDMA or CDMA/NCDMA hybrid system, and equivalently a CDM/FDM, CDM/TDM or CDM/NCDM hybrid system, which does not affect existing users in so far as it does not require that a portion of the band be set aside. Indeed, using this invention an entirely separate CDMA paging system can be inserted into the existing mobile spectrum without affecting the existing operation of the FDMA, TDMA or NCDMA satellite system.

The Mobile CDMA/FDMA Hybrid System

The spread-spectrum CDM or CDMA communications system of the present invention is a CDM/FDM or CDMA/FDMA hybrid system. Spread-spectrum CDM or CDMA can significantly increase the number of users per cell, compared to TDMA. With CDM or CDMA, each user in a cell uses the same frequency band. However, each CDM or CDMA signal has a selected-spreading sequence which enables a receiver to distinguish a desired signal from the remaining signals. Mobile users in adjacent cells use the same frequency band and the same bandwidth, and therefore "interfere" with one another. A received signal may appear somewhat noisier as the number of users' signals received by a cell increases.

Each unwanted user's signal generates some interfering power whose magnitude depends on the processing gain. Users outside a small region, e.g. 2000 foot diameter area, increase the expected interfering energy compared to users within a particular small region, by about 50%, assuming that the received powers from the users external to the particular region are attenuated by the fourth power of the distance from each user to the system station. Since the interference increase factor is not severe, frequency reuse is not employed. Each spread-spectrum region can use a full 12.5 MHz band for transmission and a full 12.5 MHz band for reception. Hence, using a chip rate of six million chips per second and a coding data rate of 4800 bps results in approximately 1250 chips per bit. Each paging user has the same code. Only one message is sent at a time, since a page is a rare event. A message is identified not by the code but by an ID in the message, or a second separate PN sequence. Since only one message is sent at a time, the number of users $N_u$ depends on how often, on the average, a user receives a page. For example, at 8 bits per character, a 50 character message takes 50×8=400 bits or one second. Thus in one hour one has 3600 messages per spot beam. There may be 100 spot beams/satellite.

To ensure that the spread-spectrum satellite system does not degrade the performance of the mobile satellite system, note that the currently existing TDMA or FDMA system requires a signal-to-noise ratio (SNR) of 17 dB. The spread-spectrum satellite system requires a SNR of 7 dB. The spread-spectrum satellite system is not allowed to interfere with the TMDA or FDMA system. For the following analysis, assume that the spread-spectrum satellite and the mobile satellite-system have the same transmitter power, e.g., one watt.

The link margins for inbuilding operation for the GSO, ICO and LEO options are summarized in Tables I, II and III respectively. The power used by the CDMA pager is given in these Tables as a percent of total power transmitted. This is called the Output Back Off (OBO) since the TDMA system must be reduced (backed-off) by that amount. For the forward link at 2.5 GHz, i.e., from the satellite to a remote unit designated in this example as a personal earth station receiver (PES RX), OBO percentages of 1%, 5% and a burst mode of 10% are enumerated. The OBO of 10% in a burst mode is recommended to enable battery operation of six days for the case when only the paging service of the phone is operational and a 90% pager sleep time is utilized. The information rate for 1% and 5% backoff is selected to ensure an $E_b/N_o = 4$ dB. The information rate in the 10% burst mode is limited, to 700 bps for the GSO and ICO configurations and to 450 bps in the LEO configuration, to ensure an acceptable acquisition time. Thus, in the burst mode, $E_b/N_o \approx 6$ dB for each configuration.

Shadowing Loss

In the Tables, 7 dB margins have been provided for shadowing loss and for losses incurred in penetrating the building and multipath fluctuation. Table IV shows the average power loss incurred when a signal penetrates a building. The loss varies as a function of the building material, and varies from 6 dB for a wooden structure to 20 dB for a concrete building. Any given building is generally constructed of a complex combination of the materials considered in Table IV, and the actual loss incurred depends on the particular building and the location within the building in which the handset user is

TABLE I

INMARSAT P - In Building Paging Channel Link Budget
GSO Option

| Satellite - PES RX: PAGING | | PES TX - Satellite: ACKNOWLEDGEMENT | |
|---|---|---|---|
| | Burst Mode | | Burst Mode |
| Satellite EIRP, dBw | 60.7 | PES EIRP, dBw | −1.0 |
| Output Back Off (%) | 1.0, 5.0  10.0 | Output Back Off, % | 0.0 |
| dB | −20.0, −13.0  −10.0 | | |
| Per Carrier EIRP, dBw | 40.7, 47.7  50.7 | Per Carrier EIRP, dBw | −1.0 |
| Slant Range, km | 42040.0 | Slant Range, km | 42040.0 |
| Frequency, GHz | 2.50 | Frequency, GHz | 1.62 |
| Path Loss, dB | 192.4 | Path Loss, dB | 188.8 |
| Atmospheric Loss, dB | 0.3 | Atmospheric Loss, dB | 0.3 |
| TDMA Interference loss, dB | 0.24 (Sec 2.5) | TDMA Interference loss, dB | 0.24 (Sec 2.5) |
| PES G/T, dB/°K. | −22.8 | Satellite G/T, dB/°K. | 7.0 |
| K, dBw/Hz/°K. | −228.6 | K, dBw/Hz/°K. | −228.6 |
| Shadowing Margin, dB | 7.0 | Shadowing Margin, dB | 7.0 |
| Building Penetration and Fading Margin*, dB | 22.0 (Eq. (1)) | Building Penetration and Fading Margin, dB | 22.0 |
| C/No (Down), dB Hz | 24.5, 31.5, 34.5 | C/No (Up), dB Hz | 16.2 |
| Information Rate, BPS | 112.0, 560.0, 700.0 | Information Rate, BPS | 16.6 |
| Channel Rate, BPS | 336.0, 1680.0, 2100.0 | Channel Rate, BPS | 49.8 |
| Eb/No, dB | 4.0, 4.0, 6.0 | Eb/No, dB | 4.0 |
| DQPSK Modulation & Rate −1/3 FEC | | DQPSK Modulation & Rate −1/3 FEC | |
| BER without Coding | $10^{-2}, 10^{-2}, 10^{-3}$ | BER without Coding | $10^{-2}$ |
| BER with Coding | $10^{-6}, 10^{-6}, <10^{-6}$ | BER with Coding | $10^{-6}$ |

*TDMA and FDMA incur 11 dB more fading loss than a 10 MHz B-CDMA signal and therefore cannot penetrate a building.

TABLE II

INMARSAT P - In Building Paging Channel Link Budget
ICO Option

| Satellite - PES RX: PAGING | | PES TX - Satellite: ACKNOWLEDGEMENT | |
|---|---|---|---|
| | Burst Mode | | Burst Mode |
| Satellite EIRP, dBw | 53.0 | PES EIRP, dBw | −1.0 |
| Output Back Off (%) | 1.0, 5.0, 10.0 | Output Back Off, % | 0.0 |
| dB | −20.0, −13.0, −10.0 | | |
| Per Carrier EIRP, dBw | 33.0, 40.0, 43.0 | Per Carrier EIRP, dBw | −1.0 |
| Slant Range, km | 14916.0 | Slant Range, km | 14916.0 |
| Frequency, GHz | 2.50 | Frequency, GHz | 1.62 |
| Path Loss, dB | 183.4 | Path Loss, dB | 179.8 |
| Atmospheric Loss, dB | 0.3 | Atmospheric Loss, dB | 0.3 |
| TDMA Interference loss, dB | 0.32 (Sec 2.5) | TDMA Interference Loss, dB | 0.32 (Sec 2.5) |
| PES G/T, dB/°K. | −24.2 | Satellite G/T, dB/°K. | −1.5 |
| K, dBw/Hz/°K. | −228.6 | K, dBw/Hz/°K. | −228.6 |
| Shadowing Margin, dB | 7.0 | Shadowing Margin, dB | 7.0 |
| Building Penetration and Fading Margin**, dB | 22.0 (Eq. (1)) | Building Penetration and Fading MArgin, dB | 22.0 |
| C/No (Down), dB Hz | 24.4, 31.4, 34.4 | C/No (Up), dB Hz | 16.7 |
| Information Rate, BPS | 110.0, 550.0, 700.0 | Information Rate, BPS | 18.6 |
| Channel Rate, BPS | 330.0, 1650.0, 2100.0 | Channel Rate, BPS | 55.8 |
| Eb/No, dB | 4.0, 4.0, 6.0 | Eb/No, dB | 4.0 |
| DQPSK Modulation & Rate −1/3 FEC | | DQPSK Modulation & Rate −1/3 FEC | |

TABLE II-continued

INMARSAT P - In Building Paging Channel Link Budget
ICO Option

| Satellite - PES RX: PAGING | | PES TX - Satellite: ACKNOWLEDGEMENT | |
|---|---|---|---|
| | Burst Mode | | Burst Mode |
| BER without Coding | $10^{-2}, 10^{-2}, 10^{-3}$ | BER without Coding | $10^{-2}$ |
| BER with Coding | $10^{-6}, 10^{-6}, <10^{-6}$ | BER with Coding | $10^{-6}$ |

**TDMA and FDMA incur 11 dB more fading loss than a 10 MHz B-CDMA signal and therefore cannot penetrate a building.

TABLE III

INMARSAT P - In Building Paging Channel Link Budget
LEO Option

| Satellite - PES RX: PAGING | | PES TX - Satellite: ACKNOWLEDGEMENT | |
|---|---|---|---|
| | Burst Mode | | Burst Mode |
| Satellite EIRP, dBw | 40.0 | PES EIRP, dBw | −1.0 |
| Output Back Off (%) | 1.0, 5.0, 10.0 | Output Back Off, % | 0.0 |
| dB | −20.0, −13.0, −10.0 | | |
| Per Carrier EIRP, dBw | 20.0, 27.0, 30.0 | Per Carrier EIRP, dBw | −1.0 |
| Slant Range, km | 4278.0 | Slant Range, km | 4278.0 |
| Frequency, GHz | 2.50 | Frequency, GHz | 1.62 |
| Path Loss, dB | 172.5 | Path Loss, dB | 168.9 |
| Atmospheric Loss, dB | 0.3 | Atmospheric Loss, dB | 0.3 |
| TDMA Interference Loss, dB | 0.39 (Sec 2.5) | TDMA Interference Loss, dB | 0.39 (Sec 2.5) |
| PES G/T, dB/°K. | −24.2 | Satellite G/T, dB/°K. | −0.5 |
| K, dBw/Hz/°K. | −228.6 | K, dBw/Hz/°K. | −228.6 |
| Shadowing Margin, dB | 7.0 | Shadowing Margin, dB | 7.0 |
| Building Penetration and Fading Margin*** | 22.0 (Eq. (1)) | Building Penetration and Fading Margin | 22.0 |
| C/No (Down), dB Hz | 22.3, 29.3, 32.3 | C/No (Up), dB Hz | 18.6 |
| Information Rate, BPS | 67.6, 338.0, 450.0 | Information Rate, BPS | 28.8 |
| Channel Rate, BPS | 202.8 1014.0, 1350.0 | Channel Rate, BPS | 86.4 |
| Eb/No, dB | 4.0, 4.0, 5.8 | Eb/No, dB | 4.0 |
| DQPSK Modulation & Rate −1/3 FEC | | DQPSK Modulation & Rate −1/3 FEC | |
| BER without Coding | $10^{-2}, 10^{-2}, 10^{-3}$ | BER without Coding | $10^{-2}$ |
| BER with Coding | $10^{-6}, 10^{-6}, <10^{-6}$ | BER with Coding | $10^{-6}$ |

***TDMA and FDMA incur 11 dB more fading loss than a 10 MHz B-CDMA signal and therefore cannot penetrate a building.

located. In addition to losses produced by penetrating the building's outer structure, losses are incurred by the signal traversing internal walls and floors. Losses of 1.5 dB per wall are typical. Losses through floors are formidable. Thus, for a traversal of one floor an average loss of 27.5 dB can be expected. For a transversal of two floors a loss of 40 dB could be incurred. These figures show that signals, received in buildings, realistically can only be expected to be received through the facade of the building and not through the floors, including the roof. In this study, a penetration loss of 10 dB (glass) was allocated for the power loss suffered by the B-CDMA signal, or a narrowband TDMA or FDMA signal, in passing into a building from a transmission emanating from the satellite.

TABLE IV

| | Building Penetration Loss | | | | |
|---|---|---|---|---|---|
| Materials | Wood | Brick | Glass | Aluminum | Concrete |
| L Penetration loss (dB) | 6 | 8 | 10 | 15 | 20 |

Where:

$L_w \cong 1.5$ dB per interior wall traversed
Losses through Floors $L_F = 27.5\ 41.7 \log N_F$ dB $N_F$ = Number of floors traversed

Multipath Fading

Figure 11:
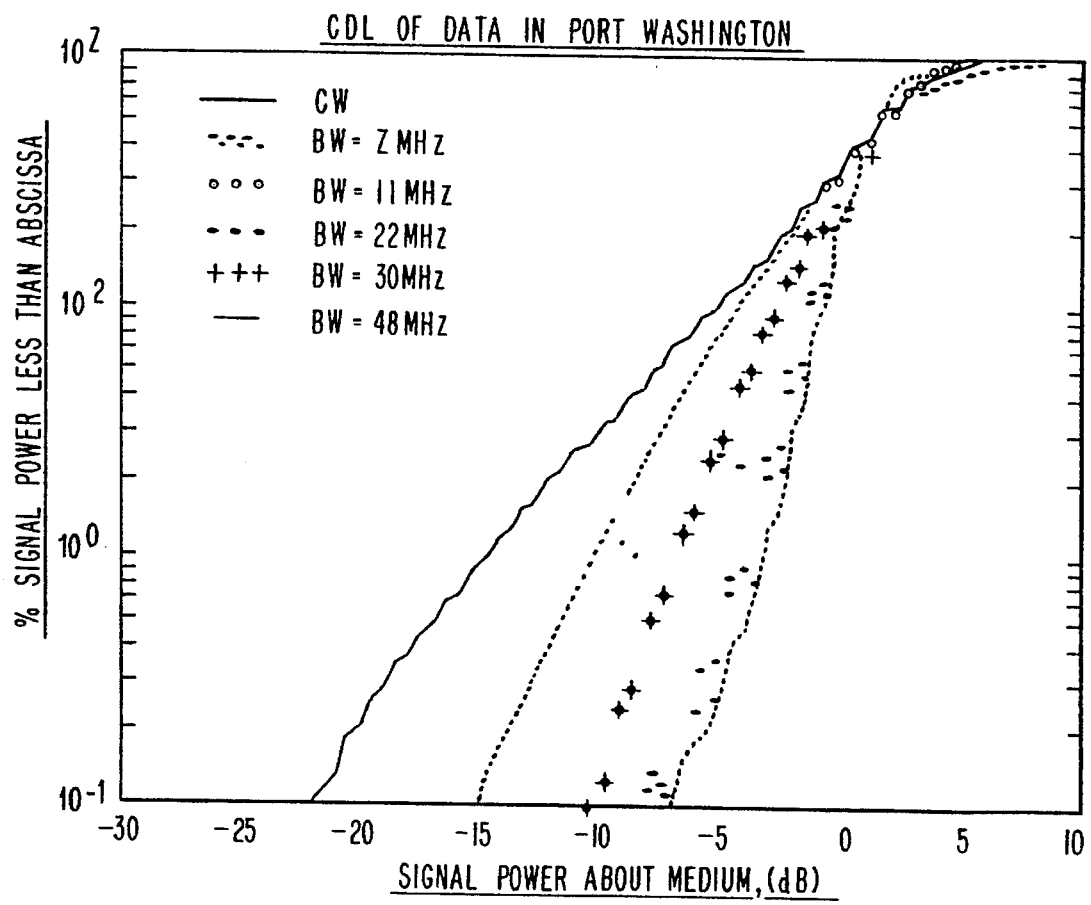
FIG. 11 illustrates multipath fading lost.
Figure 12:
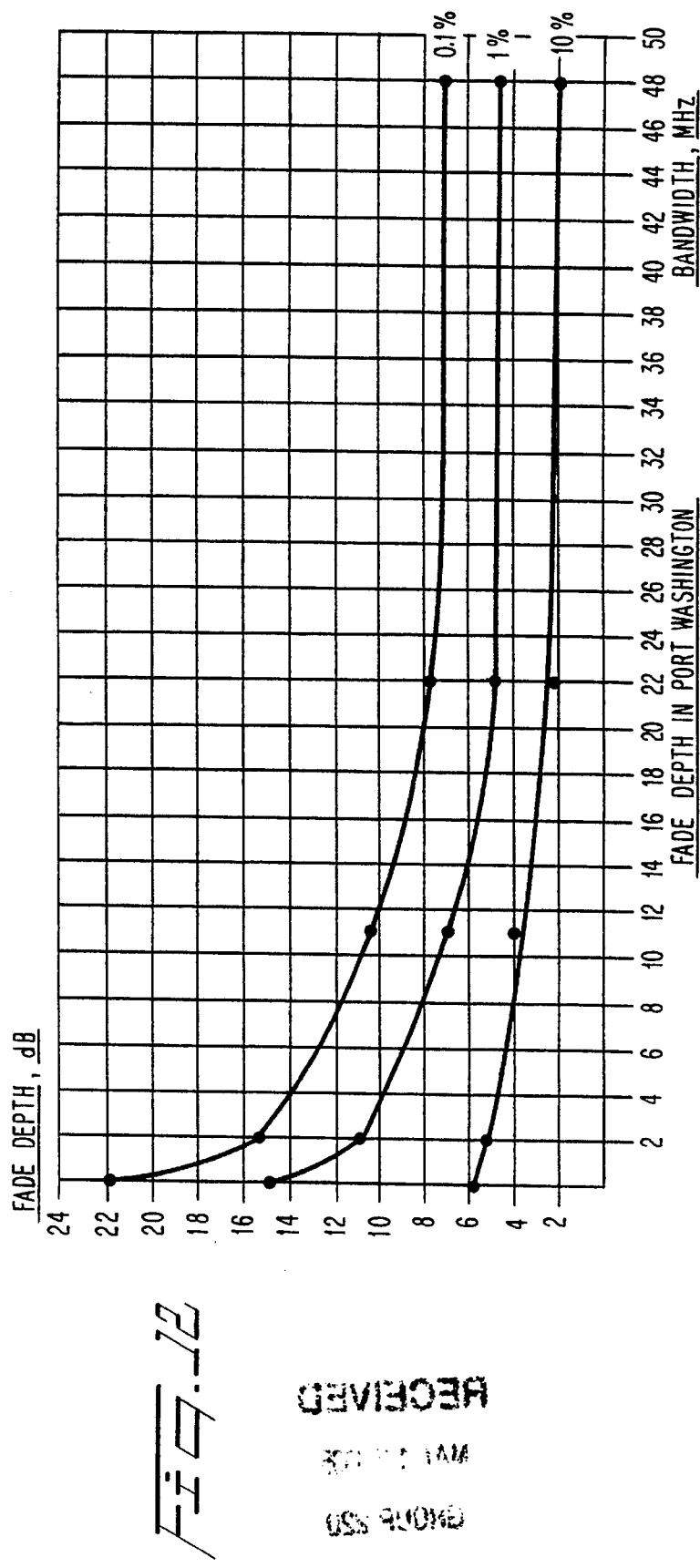
FIG. 12 illustrates fade depth measured in Port Washington, N.Y.

FIGS. 11 and 12 show expected losses of signal power due to multipath as a function of signal bandwidth. The data presented in these figures were obtained by measurements. FIGS. 11 and 12 show the cumulative distribution function (CDF) of the received signal power measured relative to the median power expected. The data demonstrates the superior immunity of B-CDMA signalling to multipath fading as compared to that of narrowband signalling such as TDMA or FDMA. Thus, from FIG. 11, as an example, for 1% of the time a CW signal can be expected to fall 15 dB below the median. A 2 MHz bandwidth signal varies almost 12 dB below the median, and a 11 MHz bandwidth signal varies about 8 dB below the median. Thus the broader bandwidth signal has 7 dB less multipath fading loss than the narrowband continuous wave (CW) signal for this percentage of time. FIG. 12 which is obtained from the data shown in FIG. 11 shows the fading data in another format. Thus, as another example, for 99.9% of the time, i.e., the 0.1% curve, a 10 MHz bandwidth signal does not fade more than about 10.5 dB below its median level while a CW signal, 0 MHz bandwidth, fades almost 22 dB below the median. The broader band signal, therefore, fades approximately 11 dB less than a narrowband signal and consequently provides approximately 11 dB more margin in a multipath fading environment than a narrowband signal.

Based on this analysis the margin allocated for the B-CDMA signal is (in dB):

Building penetration loss+Loss through walls+Multipath fading fluctuation=10+1.5+10.5=22 dB (1)

The total margin, due to multipath fading and shadowing loss is 22+7=29 dB. This figure is used in each of the link budgets for the three satellite options. Note that the margin for TDMA is 10+1.5+22=33.5 dB.

Broadband-CDMA Overlay—TDMA Notches Are Not Required

Figure 13:
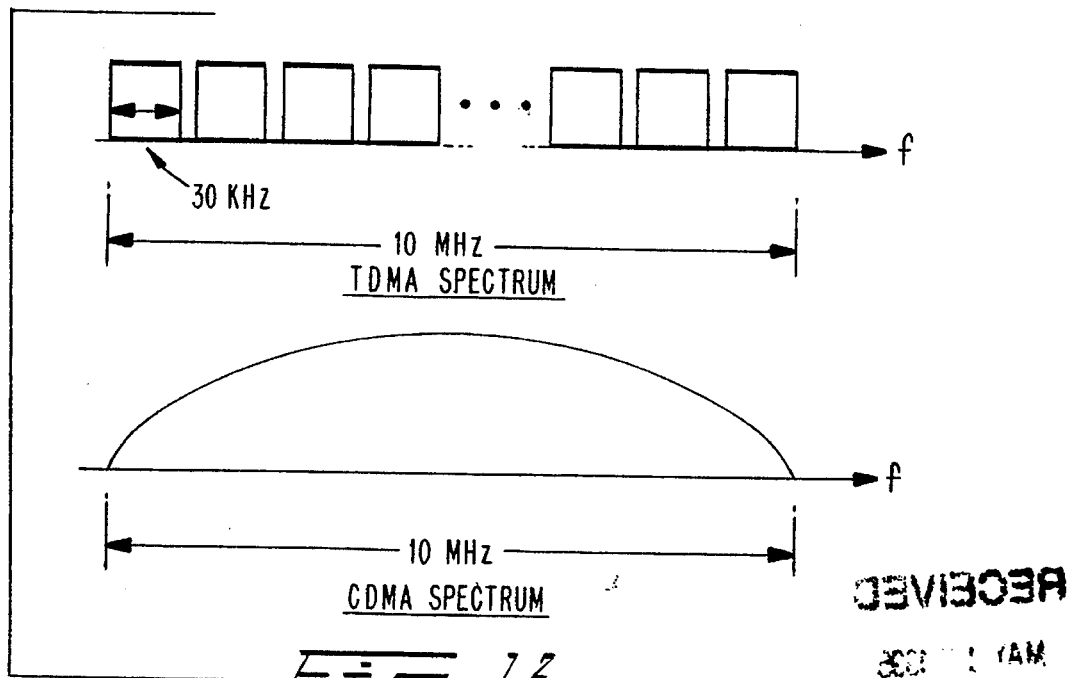
FIG. 13 illustrates CDMA overlay of a TDMA signal.

The Broadband-CDMA (B-CDMA) 10 MHz signal overlays, i.e., shares the TDMA band, as shown in FIG. 13. The TDMA signal has 8 users per 30 kHz channel, with $n_c$=6 to 10 channels per spot beam, see Table V. The full TDMA signal occupies a 10 MHz bandwidth. The B-CDMA signal is a spread spectrum waveform (chip rate=8Mcps) containing paging information, for multiple pager users, transmitted sequentially in time. Each pager handset uses the same spread spectrum code and messages are distinguished by the user ID. The use of a single spread spectrum code enormously simplifies the paging system design and reduces the cost of the system.

Since the two signals simultaneously overlap each other in time and frequency, an analysis shows possible mutual interference effects of the paging signal on the TDMA performance and the effect of the TDMA signal on the pager performance. The analysis also shows that when the B-CDMA signal uses a 10 MHz spreading waveform, the resulting mutual interference is negligible even when notches are not used to filter out the narrowband TDMA signals from the satellite transmission.

TDMA Signal-to-Interference Ratio; SIR

The signal to interference ratio at the TDMA receiver, $SIR_T$ is:

$$SIR_T = \frac{E_T}{N_o + \frac{P_P}{W}} = \frac{E_T/N_o}{1 + \frac{P_P}{N_oW}} \quad (2)$$

where $E_T/N_o=E_b/N_o$ at the TDMA handset in the absence of CDMA interference.

$N_o$=Thermal noise power density $P_p$=Pager power at handset over 10 MHz

W=10 MHz=CDMA spreading bandwidth

The loss in SIR due to the paging signal is given by the value of the denominator in Eq. (2).

In Eq. (2), $P_p/N_o$ is equal to the $C/N_o$ ratio for the paging signal given in Tables I, II and III for the different satellite options, and W is the spreading rate of the CDMA pager signal. Note that the larger the value of spreading bandwidth the less is the loss due to the paging overlay signal. The largest value of $C/N_o$, is for the GSO case using a 10% OBO. As seen from Table I this value equals 34.5 dB inside the building and is 10 dB higher outside the building since the 10 dB building penetration loss, Table IV—loss going through glass, is not incurred when the user is located in an outdoor area. Thus, the loss L in the TDMA handset SIR due to the paging channel is, letting $P_p/N_o=10^{4.45}$ and $W=10^7$ in Eq. (2):

$$L = 10 \log\left[1 + \frac{10^{4.45}}{10^7}\right] = .01 \text{ dB}$$

which is negligible. This small loss is due to the fact that the power density of the paging signal is reduced by the large bandwidth, 10 MHz used for the spread spectrum signal.

TABLE V

TDMA Capacity of the GSO, ICO and LEO Satellite Systems

| | Number of Users | Number of Channels | Number of spots | Number of Channels er spot beam, n |
|---|---|---|---|---|
| GSO | 5000 | 625 | 109 | ~6 |
| ICO | 4000 | 500 | 61 | ~8 |
| LEO | 1500 | 188 | 19 | ~10 |

Pager Signal-to-Interference Ratio; SIR The signal to TDMA interference ratio at the pager, $SIR_p$, in the absence of channel notches in the satellite is:

$$SIR_P = \frac{E_P}{N_o + \frac{P_T}{W} 2n_c} \quad (3)$$

$$= \frac{E_P/N_o}{1 + \frac{P_T}{N_oW} 2n_c} = \frac{E_P/N_o}{1 + \frac{E_T}{N_o} \frac{D_T}{W} 2n_c}$$

where $E_p$ is the energy in the paging signal $N_o$ is the thermal noise density $P_T$ is the TDMA power per channel $D_T$ is the TDMA data rate (30 kb/s)

$E_T=P_T/D_T$

W is the paging spreading signal bandwidth $n_c$ is the number of frequency channels per spot beam The factor "2" in Eq. (3) represents the effective number of spots that contribute interfering TDMA power to the pager handset. This factor is composed of the one main spot that the user is within, plus it is assumed that four additional overlapping spots are present, each covering 25% of the region, generating one additional effective spot. Table V presents the number of frequency channels per spot beam, $n_c$, for the three satellite options when 8 users per channel are present. With W=10 MHz $D_T$=30 kb/s $E_T/N_o$=2 dB the paging $SIR_p$ loss due to the TDMA signal interference without the use of satellite notches is 0.24 dB for the GSO, 0.32 for the ICO, and 0.39 dB for the LEO. These losses are suffered by the pager handset due to its overlaying the TDMA signal. This loss is specified in the Link Budget Tables I, II and III.

This loss is as small as it is, due to the large spreading bandwidth of the paging spread spectrum modulation. The use of such a large instantaneous bandwidth spreads the narrowband TDMA power over the full 10 MHz band, thereby reducing its power density relative to the thermal noise and rendering it negligible. Thus, the use of large spreading bandwidths provides two major benefits:

- It ensures that narrowband notches to remove the B-CDMA signal do not need to be used in the satellite transmitter, nor in the PES paging receiver to remove the TDMA signal;
- It also provides approximately 11 dB greater multipath fading margin than the narrowband TDMA signal, as shown in FIG. 12, enabling indoor paging operation to be supported.

BER And Paging Error Rate

Assuming a 10% backoff, DQPSK modulation and a rate $-\frac{1}{3}$ projection code, the decoded BER for the GSO, ICO and LEO options is less than $10^{-6}$. Assuming 40 characters per page, 8 bits per character and rate $-\frac{1}{3}$ coding, results in an average of 1000 bits/page. With a BER of $10^{-6}$ the expected number of errors=$1000 \times 10^{-6}$ or one error per 1000 pages.

RAKE Processing Is Not Required

Figure 14:
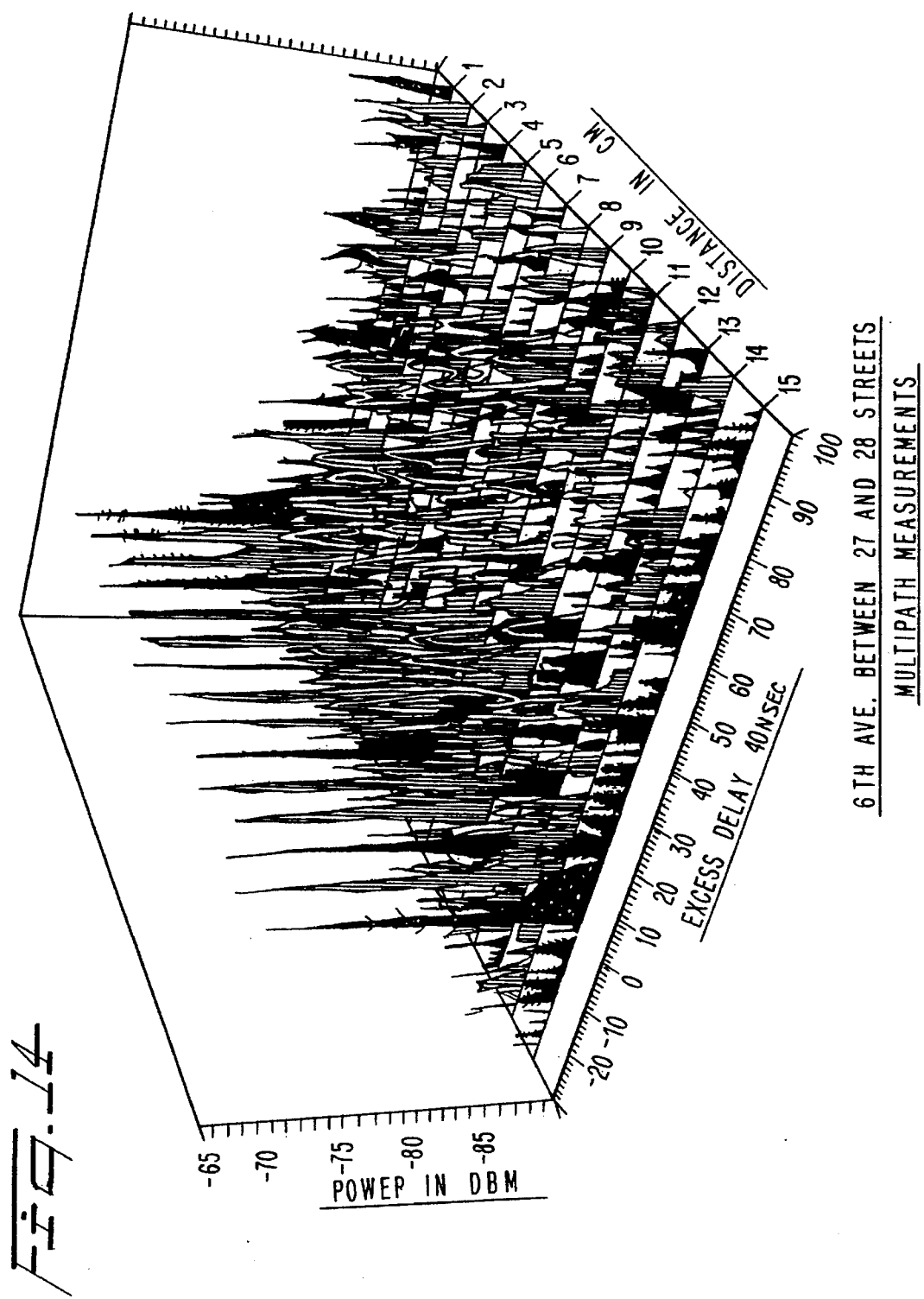
FIG. 14 shows multipath measurements.

A 10 MHz spread spectrum receiver can resolve multipath components which are delayed by more than one chip length or 125 nanoseconds. This time offset corresponds to path differences of 125 feet or more. Those paths which differ in length by less than 125 feet contribute to the fading losses enumerated in FIGS. 11 and 12. The losses are accounted for in the link budgets and margins. Therefore the accumulation of the energy in components which may be delayed by more than 125 nanoseconds is not necessary to maintain performance for the specified channel. FIG. 14 shows the multipath response experimentally obtained by a receiver on $6^{th}$ Avenue between $27^{th}$ and $28^{th}$ Streets in New York City due to a transmitter placed on the roof of a building on 23rd Street and $6^{th}$ Avenue. In FIG. 14 the multipath power is plotted as a function of distance over a wavelength and delay, each unit represents 40 nanoseconds. Note that at each distance the multipath response consists of a strong main peak contained within 100 nanoseconds and smaller peaks spaced more than 100 nanoseconds apart. Note also that these smaller peaks are more than 6 dB below the main peak. Hence, although a RAKE receiver could be employed, the power increase would not be more than 1 dB. The multipath performance of a satellite—PES link is expected to be significantly less severe than a link from a base station to mobile user in New York City. Thus, RAKE processing is not proposed for the Inmarsat—P paging system.

Data Rate Per User and Output Back Off (OBO)

Equation (3) defines the required relationship between the satellite power, paging OBO, propagation and interference losses and the data rate per pager user. For a signal-to-noise ratio, SNR, of 4 dB, Eq. (3) becomes:

$$SNR_P = 10^{0.4} = \frac{P_P}{D_P N_o}$$

where $D_p$ is the data rate of the pager, $P_p/N_o$ is the value of $C/N_o$ in the downlink from Tables I, II and III and $E_p = P_p/D_p$. Solving for $D_p$ yields $$D_p = 10^{-0.4} P_p/N_o \qquad (4)$$

Figure 15:
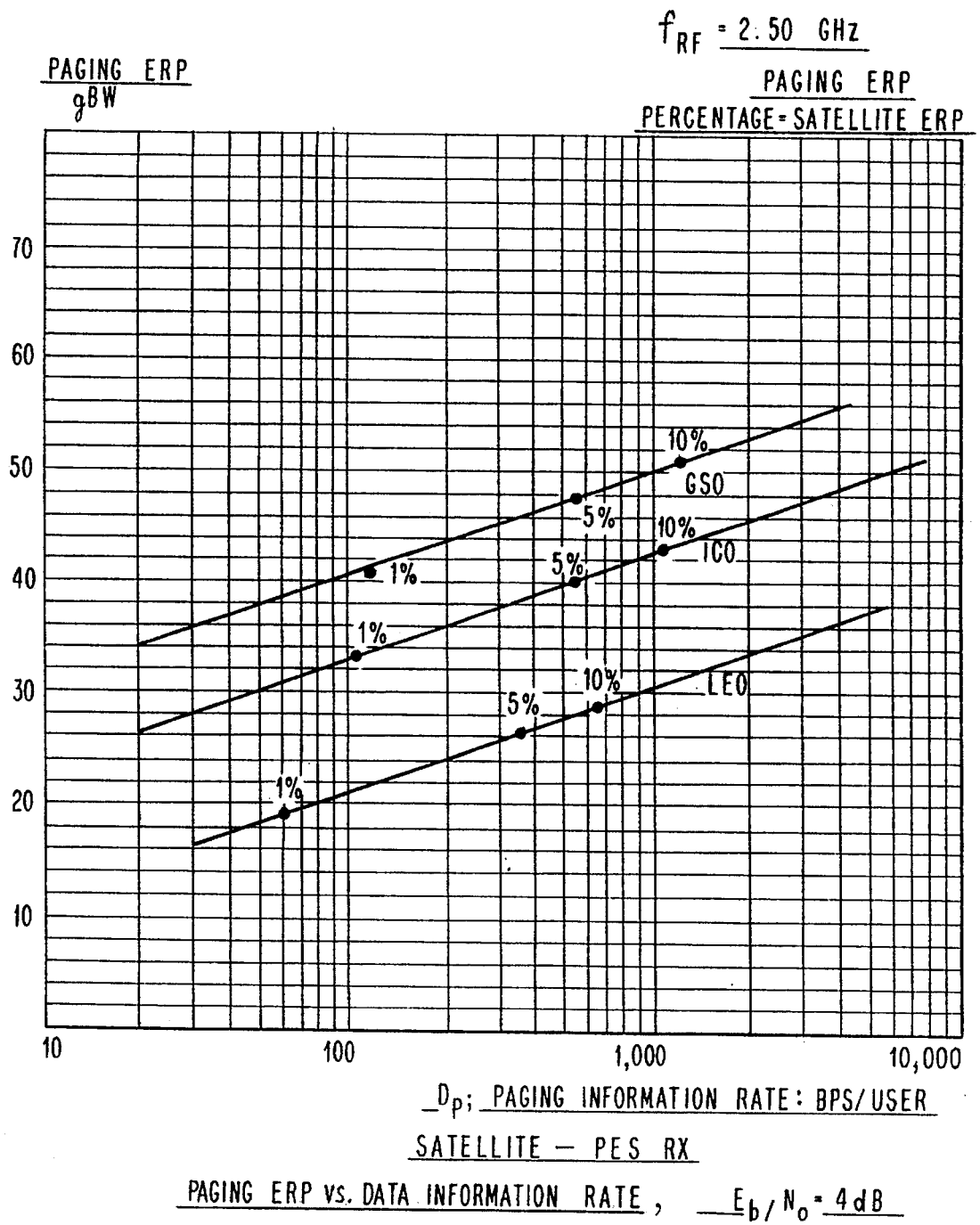
FIG. 15 illustrates paging ERP vs. data information rate, for $E_b/N_o=4$ dB.

With the losses specified in Tables I, II and III, FIG. 15 plots the relationship between the data rate per pager user, $D_p$, and the paging power ERP from the satellite for the GSO, ICO and LEO satellite options. FIG. 15 shows that the LEO satellite option can support the smallest user data, about 67.6 bps at a 1% ratio of satellite paging ERP to satellite ERP. The GSO satellite configuration can provide the largest data rate, approximately 112 bps, at a 1% paging power to satellite power ratio.

In the example system a 10% backoff was used since the power consumption could be accommodated by removing a single TDMA channel, see Table V, per spot beam. In this case the data rates of 750 bps for the GSO and ICO and 450 bps for the LEO satellites can be attained, see Tables I, II and III. The resulting SNR, $P_p/D_p N_o$, is approximately 6 dB for each satellite configuration.

Acknowledgement Option

Tables I, II and III provide the link budgets for a PES TX—Satellite acknowledgement link option. This B-CDMA link would operate at 1.62 GHz. Per user ERP for the pager handset is specified by Inmarsat at −1 dBW. For the three satellite options the link analysis shows that acknowledgement from within the building can be supported at information rates of approximately 16.6 to 28.8 bps. This rate is limited by the transmit ERP, propagation loss, and the margins required for signal shadowing and building penetration. The bit rates could be increased significantly if the pager acknowledgement occurred only outdoors. In this case the building penetration loss of 10 dB would not be incurred and the information rate that could be supported can be increased by a factor of ten, to about 166 to 288 bps.

The information to be sent back during an acknowledgement includes the message number, the sender ID and the destination address for a total of approximately 67 bits. $E_b/N_o$ levels of 4 dB provide an uncoded BER of approximately $10^{-2}$. Using a rate $-\frac{1}{3}$ forward error correction block encoder reduces the coded BER to less than $10^{-6}$.

There are approximately 200 coded bits transmitted during an acknowledgement. Since the coded bit rate exceeds 50 bps, see Tables I, II, III, each acknowledgement takes about four seconds. In order to ensure a successful acknowledgement, without a collision from another user, a new acknowledgement is possible every 1.5 seconds. The paging information may be required to contain the coefficients of one of three PN codes needed by the PES for the acknowledgement transmission. In this way each spot beam uses three B-CDMA receivers, each with one of the codes and up to 3 acknowledgements per spot beam can be simultaneously decoded without collision. The LEO satellite system only requires two PN codes.

Phase Jitter

The transmission of low data rates for ACK at the pager handset imposes restrictions on the phase jitter requirements of the oscillators needed for modulation at the handset and demodulation at the satellite. These restrictions are relaxed if DQPSK modulation is used at the pager transmitter, and DQPSK demodulation is used at the satellite receiver. The performance of the demodulation process then depends on the correlation function of the phase jitter evaluated at time offsets of the reciprocal of the coded data rate or about 20 milliseconds. Specifying and designing the phase jitter spectrum to be narrower than 50 Hz and using DQPSK minimizes the SNR losses due to such phase jitter.

Power Budget, Battery Life and Handset Sleeping

The RF and Digital sections of the spread spectrum pager handset draw approximately 125 milliwatts and 375 milliwatts, respectively, for a total of 0.5 watts. The Inmarsat cellular phone utilizes a battery with a capacity of 7.25 watt-hours. If only the pager were operational then the battery would be discharged in 14.5 hours, or less than one day of operation. To increase the time between required charges, the pager handset receiver would be operated in a "burst mode".

With the pager operating in the 10% burst mode, the coded data rates, as seen in Tables I, II and III are 2100, 2100 and 1350 bps respectively. These bits are transmitted in 1.5 seconds followed by a sleep time of 13.5 seconds. In this mode of operation the battery life would be extended by a factor of 10 to 145 hours, which is approximately 6 days. Note that since the PES pager sleeps for 13.5 seconds of every 15 seconds, ten groups of users are established, each synchronized to a different clock, so that no two paging groups transmit simultaneously.

TDMA Channels and Paging OBO

In the Inmarsat system the total power of the satellite is kept fixed. As power is provided for paging the power available for TDMA telephony is reduced. This reduced power is distributed over fewer TDMA channels to keep the performance of each TDMA channel from deteriorating.

For a distribution of 10% of the power for paging and 90% for TDMA, the number of TDMA channels must be reduced by 10%. Referring to Table V, this corresponds approximately to a 1 channel loss per spot beam. Dropping one channel per spot leads to a loss of capacity of each spot for each of the satellite options. The resulting total number of channels is presented in Table VI.

TABLE VI

| | Channels Per Spot Beam | | |
|---|---|---|---|
| Satellite | Number of Channels Per Spot Beam (Table V) | Number of Channels Per Spot Beam after 10% Loss | Percent Loss (%) |
| GSO | 6 | 5 | 16 |
| ICO | 8 | 7 | 12.5 |
| LEO | 10 | 9 | 10 |

Acquisition for the GSO and ICO Satellites

When the PES is initially turned on, or reception is changed between spot beams in a satellite, or between satellites, an initial acquisition must take place. To make a reliable initial acquisition decision it is required to use doppler channels - thereby reducing the uncertainty bandwidth over which each filter responds and thereby increasing the output SNR of the filter which contains the signal. The present invention may incorporate an FFT in its despreader to obtain a doppler channel bandwidth, approximately equal to the coded data rate of 2.1 kHz, which results in an output SNR, $SNR_o$, greater than (see Tables I and II)

$$SNR_o = 34.4 - 10 \log 2100 = 1.2 \text{ dB}$$

Noncoherently accumulating 10 samples—each of which has a SNR of 1.2 dB results in an accumulated SNR of 8 dB.

In performing the acquisition process, the reference code is slipped at ½ chip increments for each code position to be searched. The number of code chips per PN period equals $2^{11} - 1 = 2047$. Thus, there are $2 \times 2047 = 4094$ possible decision samples to be made. Each sample requires a time $T_s$ which is approximately $$T_s = 10 \text{ samples}/2.1 \text{ KHz} = 4.8 \text{ ms}$$

Thus, the maximum initial acquisition time, $T_{IA}$, equals:

$$T_{IA} = 4094 \times 4.8 \text{ ms} = 19.6 \text{ sec}$$

This is the maximum time required for the GSO and ICO page handsets to initially synchronize to the received signal when it is first turned on.

Acquisition for the LEO Satellite

For the LEO option the FFT provides a doppler bandwidth approximately equal to 1350 Hz. This results in an output SNR, $SNR_o$, equal to, see Table III, $$SNR_o = 3.23 - 10 \log 1350 = 1 \text{ dB}$$

Accumulating 10 of these samples noncoherently increases the $SNR_o$ to 8 dB. Therefore the accumulated $SNR_o = 8$ dB is the same as for the GSO and ICO options. The maximum initial acquisition time for the LEO satellite $T_{IA}$, is equal to:

$$T_{IA} = 4094 \times 10 \times \frac{1}{1350} = 30 \text{ sec}$$

This is the maximum time required for the pagers using LEO satellites to initially acquire when the pager is first turned oil.

Effect of the Change of Spot Beam or Satellite on Acquisition

Periodically the pager burst received by a particular pager user changes from one spot beam to another beam or from one satellite to another. This change requires a new initial acquisition to occur.

Effect of "Sleep" Time on Acquisition

Since the PES is on for 10% of the time and off 90% of the time, PN clock drift occurs which requires reacquisition of the PN code. As an example, assume that the frequency stability of the PN clocks, at the pager and in the satellite are ±½ ppm. At 8 Mcps the timing between the pager reference code and the incoming code from the satellite can slip at a maximum slip rate equal to:

$$\text{Maximum slip rate} = 2 \times \frac{1}{2} \times 10^{-6} \times 8 \times 10^6 = 8 \text{ chips/sec.}$$

The factor of 2 is a result of our worst-case assumption that the incoming and local signals drift in different directions. This rate is the maximum slip rate. The tracking circuits in the receiver are designed to estimate the code clock drift during the 90% portion of time that the signal is not present at the input. Thus, the slip rate is reduced to at most 10% of this amount, or 0.8 chip/second.

To calculate the worst case reacquisition time, consider the LEO satellite which has the narrowest bandwidth. With a doppler bandwidth of 1350 Hz for the LEO and for a repetition time (see FIG. 3.3) of 15 sec, the worst case total drift will be:

$$\text{Chips drifted} = 0.8 \text{ chip/s} \times 15 \text{ sec} = 12 \text{ chips}$$

Figure 3A:
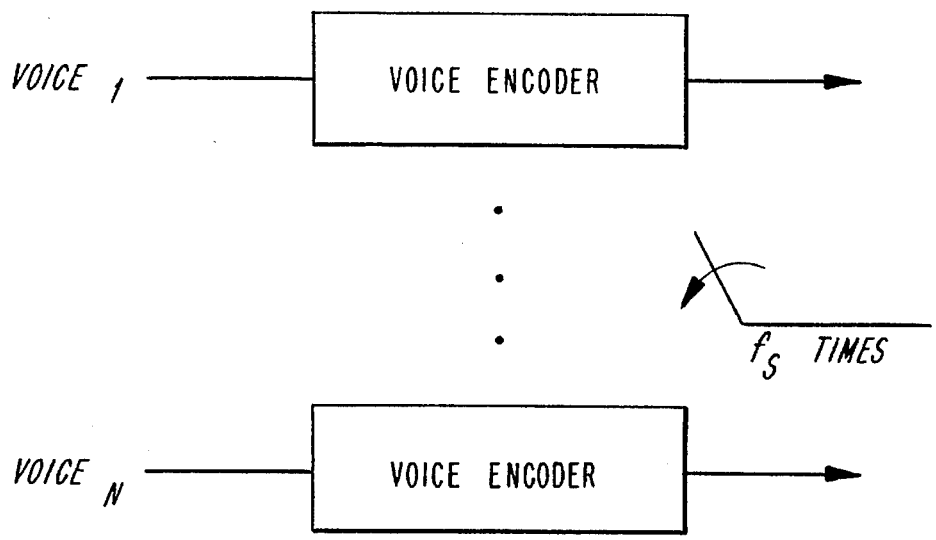
FIGS. 3A and 3B illustrate time division multiple access.
Figure 3B:
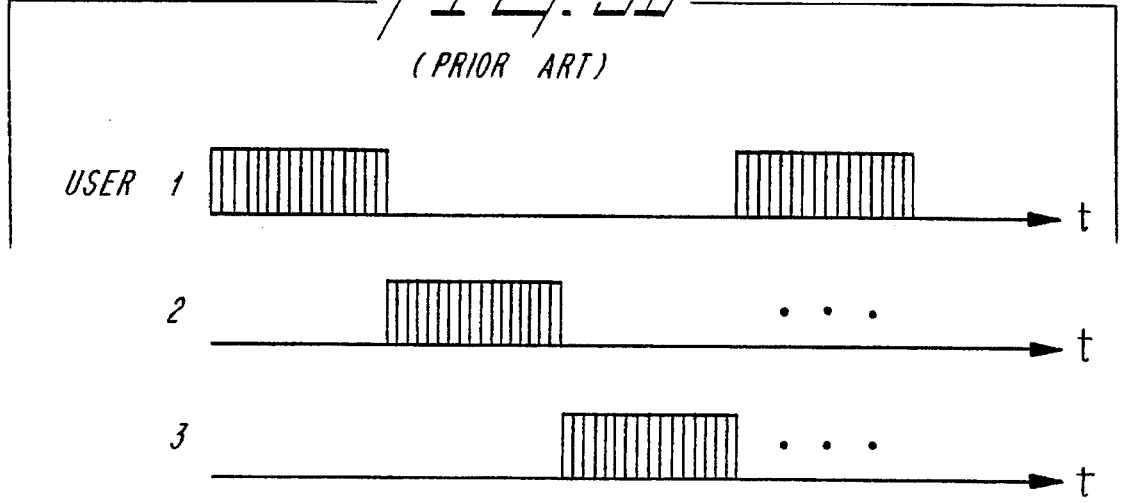

Thus, the time to reacquire becomes $T_{reacq} = 2 \times 12 \times 10/1350 = 180$ ms Thus, an "on" time of 1.5 seconds, as shown in FIG. 3.3, allows for a message time of 1 sec. and a reacquisition time of 500 ms, which is considerably greater than the calculated reacquisition time of 180 ms.

Number of Users

The average time between pages to a particular user is assumed to equal 1 page every three hours, or 1 page per 10,800 sec. The satellite transmits a group page every 1.5 sec., therefore the number of users per spot beam that can be supported equals:

$$\frac{10800}{1.5} = 7200 \text{ users/beam}$$

From the foregoing analysis, a person of skill in the art recognizes that the present invention allows a spread-spectrum satellite system to overlay a mobile-satellite system, without modification to the mobile-satellite system. The present invention allows frequency reuse of already allocated frequency spectrum to the mobile-satellite system. At the same time performance of the mobile-satellite system is not degraded. The spread-spectrum satellite system may add an increase of 200 remote users over the 50 cellular users. The present system performance calculations are considered conservative, and an increase in remote users may be greater than the estimated 200.

It will be apparent to those skilled in the art that various modifications can be made to the spread-spectrum satellite system of the instant invention without departing from the scope or spirit of the invention, and it is intended that the present invention cover modifications and variations of the spread-spectrum satellite system provided they come within the scope of the appended claims and their equivalents.

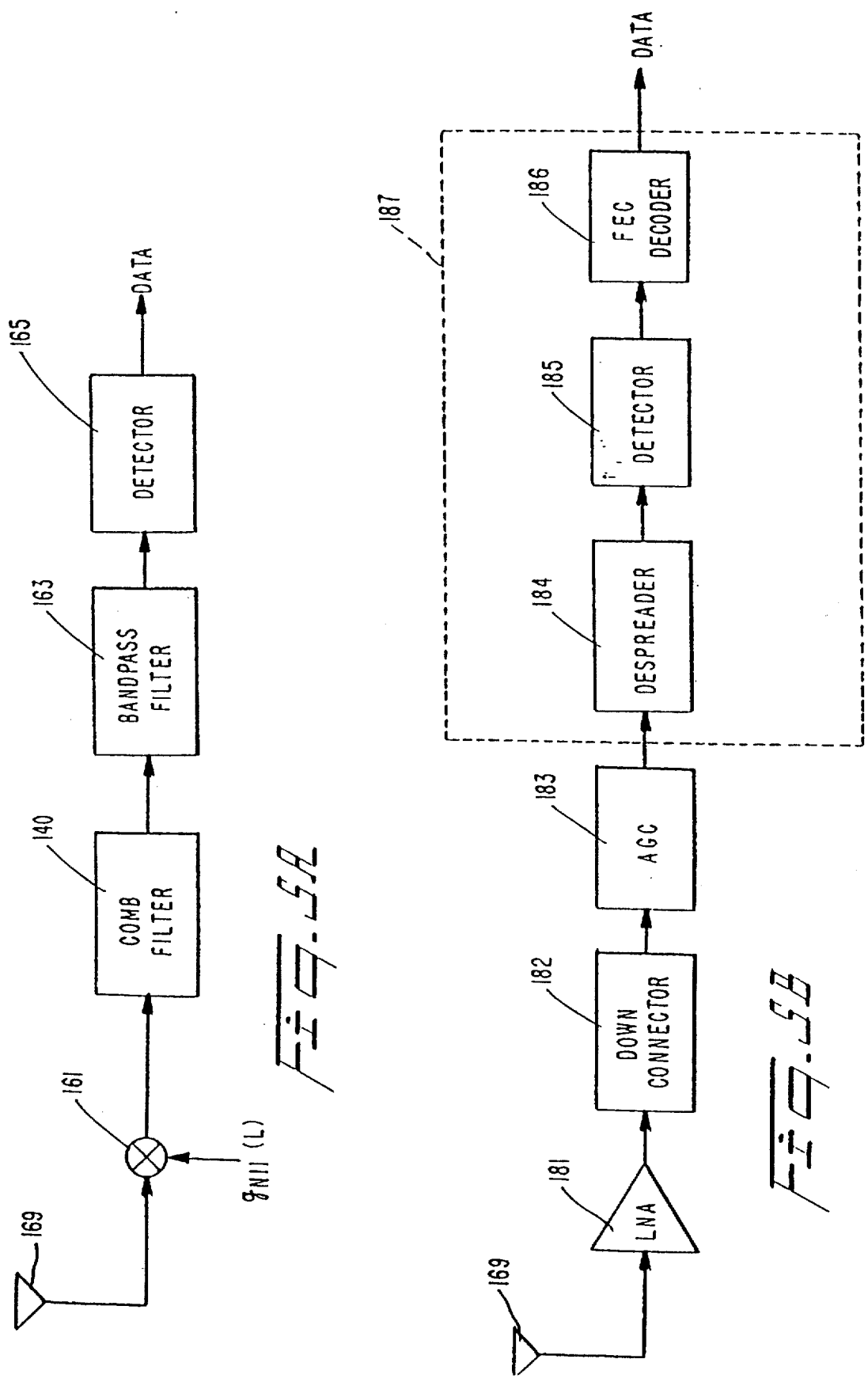

I claim:

1. A spread-spectrum satellite system for communicating data from a satellite to a plurality of remote pager units, said spread-spectrum satellite system having said plurality of remote pager units located in a same geographical region as covered by a mobile-satellite system, with the mobile-satellite system having a mobile bandwidth and having mobile-satellite users communicating using the mobile bandwidth, said spread-spectrum satellite system overlaying in spectrum the mobile bandwidth for simultaneous communication of mobile-satellite satellite voice and spread-spectrum satellite paging information, said spread-spectrum satellite system comprising:

a satellite, having an antenna beamwidth overlaying the same geographical region as covered by said mobile-satellite system, for communicating data to the plurality of remote pager units;

system means for converting a format of the data into a form suitable for communicating over radio waves;

system-product means for spread-spectrum processing the converted data;

system means for transmitting across at least part of the mobile bandwidth, simultaneously and non-interferingly with a transmission from said mobile-satellite system on the same part of the mobile bandwidth, the spread-spectrum-processed-converted data from the satellite to a respective one of the plurality of remote pager units; and a plurality of remote pager units, located within the same geographical area as covered by said mobile-satellite system, for receiving on the same part of the mobile bandwidth the spread-spectrum-processed-converted data, each of said remote pager units including, a remote antenna; and remote-detection means coupled to said remote antenna for recovering data communicated from said satellite.

2. The spread-spectrum satellite system as set forth in claim 1 wherein said remote-detection means includes means for converting the format of the data into a form suitable for a user.

3. The spread-spectrum satellite system as set forth in claim 1 wherein said remote-detection means includes means for generating a local spreading sequence, said local spreading sequence for comparing with signals received, to recover data sent from said satellite to said remote pager unit.

4. The spread-spectrum satellite system as set forth in claim 1 wherein said remote-detection means includes means for synchronizing a spreading sequence to received signals.

5. The spread-spectrum satellite system as set forth in claim 1 wherein said system-product-processing means includes means for processing data for a particular remote pager unit with a selected spreading sequence.

6. The spread-spectrum satellite system as set forth in claim 1 wherein said system transmitting means transmits the spread-spectrum-processed-converted data in a time division format.

7. A spread-spectrum satellite paging system for communicating data in a same geographical region as covered by a mobile-satellite system, with the mobile-satellite system having a mobile bandwidth divided into a plurality of mobile channels separated by a plurality of guard bands, respectively, and having mobile-satellite users communicating on the plurality of mobile channels, said spread-spectrum satellite paging system overlaying in spectrum the mobile bandwidth, said spread-spectrum satellite paging system comprising:

a satellite for communicating data across at least part of the mobile bandwidth, simultaneously and non-interferingly with a transmission from said mobile-satellite system on the same part of the mobile bandwidth; and a plurality of remote units, located within the same geographical region as covered by the mobile-satellite system, for receiving the data from the satellite, each of said plurality of remote units including, a remote antenna;

remote-filter means coupled to said remote antenna for notch filtering the plurality of mobile channels; and remote-detection means coupled to said remote-filter means, for recovering the data communicated from said satellite.

8. The spread-spectrum satellite paging system as set forth in claim 7 wherein said remote-detection means includes means for converting a format of the data into a form suitable for a user.

9. The spread-spectrum satellite paging system as set forth in claim 7 wherein said remote-detection means includes means for generating a local spreading sequence, said local spreading sequence for comparison with signals received, to recover data sent from said satellite to said remote unit.

10. The spread-spectrum satellite paging system as set forth in claim 7 wherein said remote-detection means includes means for synchronizing a spreading sequence to received signals.

11. The spread-spectrum satellite paging system as set forth in claim 7, with said satellite including system-product-processing means for processing data for particular remote units with a selected spreading sequence.

12. The spread-spectrum satellite paging system as set forth in claim 11, with said satellite including transmitting means for transmitting the processed data to particular remote units in a time division format.

13. A remote unit for use with a spread-spectrum satellite system for receiving data from a satellite, said spread-spectrum satellite system having a plurality of remote units located within a same geographical region as covered by a mobile-satellite system, with the mobile-satellite system having a plurality of mobile-satellite users communicating on a plurality of mobile channels, said spread-spectrum satellite system overlaying in spectrum the plurality of mobile channels for communicating with the plurality of remote units simultaneously and non-interferingly with communications between the plurality of mobile-satellite users, said remote unit comprising:

a remote antenna;

a comb filter for notch filtering the plurality of mobile channels; and a spread-spectrum receiver for recovering data communicated from said satellite.

14. A method, using a spread-spectrum satellite system, for communicating data from a satellite to a plurality of remote units, said spread-spectrum satellite system having said plurality of remote units located within a same geographical region as covered by a mobile-satellite system, with the mobile-satellite system having a mobile bandwidth and a plurality of mobile-satellite users communicating on the mobile bandwidth, said spread-spectrum satellite system communicating with said plurality of remote units simultaneously and non-interferingly with the mobile-satellite system communicating with the plurality of mobile-satellite users, and using at least part of the same mobile bandwidth, said method comprising the steps of:

converting a format of the data into a form suitable for communicating over radio waves;

spread-spectrum processing the converted data;

transmitting, from said satellite, the spread-spectrum-processed-converted-data as a data signal across at least part of the mobile bandwidth;

receiving the data signal; and recovering, at a remote unit, the data from the data signal.

15. The method as set forth in claim 14, wherein the step of recovering the data from the data signal includes converting a format of the recovered data into a form suitable for a user.

16. The method as set forth in claim 14, wherein the step of spread-spectrum processing the converted data includes the steps of:

generating a selected spreading sequence;

comparing the selected spreading sequence to at least one received signal; and recovering data sent from said satellite at said remote unit.

17. The method as set forth in claim 14, wherein the step of spread-spectrum processing the converted data includes synchronizing the spread-spectrum processing of the converted data to at least one received signal.

18. The method as set forth in claim 14, wherein the step of spread-spectrum processing the converted data includes processing data for a particular remote unit with a selected spreading sequence.

19. The method as set forth in claim 14, wherein the step of transmitting includes transmitting the data signal to a remote unit in a time division format.

20. A method, using a spread-spectrum receiver, for receiving spread-spectrum signals containing data at a remote unit of a spread-spectrum satellite paging system, said spread-spectrum satellite paging system having a plurality of remote units located within a same geographical region as covered by a mobile-satellite system, with the mobile satellite system having a mobile bandwidth divided into a plurality of mobile channels separated by a plurality of guard bands, respectively, and having a plurality of mobile-satellite users communicating on the plurality of mobile channels, respectively, said spread-spectrum satellite paging system communicating with said plurality of remote units simultaneously and non-interferingly with the mobile-satellite system communicating with the plurality of mobile-satellite users, and using at least part of the same mobile bandwidth, said method comprising the steps of:

receiving the spread-spectrum signals transmitted over at least a part of the mobile bandwidth;

notch filtering at the plurality of mobile channels; and recovering the data from the spread-spectrum signals.

21. The method as set forth in claim 20 wherein the notch filtering step includes notch filtering with band rejection at the plurality of mobile channels.

22. A spread-spectrum satellite paging system for communicating paging data from a satellite to a plurality of remote pager units, said spread-spectrum satellite paging system having said plurality of remote pager units located in a same geographical region as covered by a mobile-satellite system, with the mobile-satellite system having a mobile bandwidth and having mobile-satellite users communicating using the mobile bandwidth, said spread-spectrum satellite system comprising:

a satellite, having an antenna beamwidth overlaying the same geographical region as covered by said mobile-satellite system, for communicating paging data to the plurality of remote pager units;

system means for converting a format of the paging data into a form suitable for communicating over radio waves;

system-product means for spread-spectrum processing the converted paging data as spread-spectrum-processed paging data;

system means for transmitting across the mobile bandwidth, simultaneously and non-interferingly with a transmission from said mobile-satellite system, the spread-spectrum-processed paging data from the satellite to a respective one of the plurality of remote pager units; and a plurality of remote pager units, located within the same geographical area as covered by said mobile-satellite system, for receiving on the mobile bandwidth the spread-spectrum-processed paging data, each of said remote pager units including, a remote antenna; and remote-detection means coupled to said remote antenna for recovering the paging data communicated from said satellite.

23. A method, using a spread-spectrum satellite paging system, for communicating paging data from a satellite to a plurality of remote paging units, said spread-spectrum satellite system having said plurality of remote paging units located within a same geographical region as covered by a mobile-satellite system, with the mobile-satellite system having a mobile bandwidth and a plurality of mobile-satellite users communicating on a plurality of mobile channels within the mobile bandwidth, said method comprising the steps of:

converting a format of the paging data into a form suitable for communicating over radio waves;

spread-spectrum processing the converted paging data;

transmitting, from said satellite, the spread-spectrum-processed-converted-paging data as a data signal using the mobile bandwidth, said data signal transmitted simultaneously and non-interferingly with a mobile-satellite-system communication signal transmitted using the mobile bandwidth;

receiving the data signal at a remote unit;

notch filtering at the plurality of mobile channels; and recovering, at the remote unit, the paging data from the data signal.

24. The method as set forth in claim 23, wherein the step of recovering the data from the data signal includes converting a format of the recovered data into a form suitable for a user.

25. The method as set forth in claim 23, wherein the step of transmitting includes transmitting the data signal to a remote unit in a time division format.

* * * * *

UNITED STATES PATENT AND TRADEMARK OFFICE
CERTIFICATE OF CORRECTION

PATENT NO.   :  5,469,468
DATED        :  Nov. 21, 1995
INVENTOR(S)  :  Donald L. Schilling It is certified that error appears in the above-identified patent and that said Letters Patent is hereby corrected as shown below:

<u>In the Figures</u>:

In FIG. 4D, item 402, delete "CONVEILER" and insert --CONVERTER--.

In FIG. 4D, item 423, delete "OPSK" and insert --QPSK--.

In FIG. 5C, item 503, delete "CONVEILER" and insert --CONVERTER--.

In FIG. 5C, item 514, delete "FILLER" and insert --FILTER--.

In FIG. 5C, item 515, delete "DOPSK" and insert --DQPSK--.

<u>In the Specification</u>:

```
Column  6:  line 12:  delete "45" and insert --4B--;and
            line 15:  delete "45" and insert --4B--.
Column  7:  line 32:  delete "BDCMA" and insert --B-
                      CDMA--.
Column 18:  line 19:  delete "er" and insert --per--.
Column 22:  line  6:  delete "=" and insert --≃--.
```

Signed and Sealed this

Eighteenth Day of March, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO : 5,469,468

DATED : November 21, 1995

INVENTOR(S) : Donald L. Schilling

It is certified that error appears in the above-identified patent and that said Letters Patent is hereby corrected as shown below:

Drawing sheet 6 of 13 should be deleted to be replaced with the attached sheet 6 of 13 consisting of Fig. 5A and 5B.

Signed and Sealed this

Twenty-first Day of March, 2000

Attest:

Attesting Officer

Q. TODD DICKINSON

Commissioner of Patents and Trademarks